(12) United States Patent
Adams et al.

(10) Patent No.: US 9,413,782 B1
(45) Date of Patent: *Aug. 9, 2016

(54) MALWARE DETECTION USING INTERNAL MALWARE DETECTION OPERATIONS

(71) Applicant: Juniper Networks, Inc., Sunnyvale, CA (US)

(72) Inventors: Kyle Adams, Brisbane, CA (US); Daniel J. Quinlan, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,752

(22) Filed: Jan. 27, 2015

Related U.S. Application Data

(60) Provisional application No. 61/972,554, filed on Mar. 31, 2014.

(51) Int. Cl.
*G06F 11/00* (2006.01)
*H04L 29/06* (2006.01)

(52) U.S. Cl.
CPC ............................... *H04L 63/145* (2013.01)

(58) Field of Classification Search
CPC ....................................................... G06F 21/56
USPC ....................................................... 726/22–24
See application file for complete search history.

(56) References Cited

U.S. PATENT DOCUMENTS

| | | | | |
|---|---|---|---|---|
| 2006/0236392 A1* | 10/2006 | Thomas | ............... | G06F 21/562 726/23 |
| 2006/0266250 A1* | 11/2006 | Stallo | ....................... | G06F 8/24 104/2 |
| 2008/0127306 A1* | 5/2008 | Blumfield | ............ | H04L 63/1441 726/3 |
| 2010/0088761 A1* | 4/2010 | Podjarny | ................ | G06F 21/00 726/22 |
| 2011/0209218 A1* | 8/2011 | McRae | .................... | G06F 21/53 726/23 |
| 2011/0231365 A1* | 9/2011 | Bahl | ........................ | G06F 8/34 707/626 |
| 2012/0158737 A1* | 6/2012 | Levy | ....................... | H04L 43/18 707/748 |
| 2012/0204260 A1* | 8/2012 | Cecil | ..................... | G06F 21/554 726/22 |

(Continued)

OTHER PUBLICATIONS

Chen et al., "Towards an understanding of anti-virtualization and anti-debugging behavior in modern malware," 2008 IEEE International Conference on Dependable Systems and Networks With FTCS and DCC (DSN) Year: 2008 pp. 177-186.*

(Continued)

*Primary Examiner* — Roderick Tolentino
(74) *Attorney, Agent, or Firm* — Harrity & Harrity, LLP

(57) ABSTRACT

A system may determine to perform an internal malware detection operation to detect malware executing on a client device. The system may perform the internal malware detection operation. The internal malware detection operation may be performed locally on a particular device without requiring communication with another device. The system may modify an environment executing on the particular device, to form a modified environment, based on performing the internal malware detection operation. The system may monitor the modified environment for a particular behavior indicative of a malware infection. The system may detect that the particular behavior has occurred. The system may provide a notification that the client device is infected with malware based on detecting that the particular behavior has occurred. The notification may cause one or more network devices to block network traffic to or from the client device.

20 Claims, 19 Drawing Sheets

(56) References Cited

U.S. PATENT DOCUMENTS

2012/0311708 A1* 12/2012 Agarwal ............... G06F 21/55
726/24
2015/0244733 A1* 8/2015 Mohaisen ........... H04L 63/1425
726/23

OTHER PUBLICATIONS

Ang et al., "MAVMM: Lightweight and Purpose Built VMM for Malware Analysis," Computer Security Applications Conference, 2009. ACSAC '09. Annual Year: 2009 pp. 441-450.*

FireEye, "Endpoint Security (FireEye HX Series)," https://www.fireeye.com/products/hx-endpoint-security-products.html, Nov. 9, 2014, 2 pages.

Wildfire, "Wildfire: Dynamic Analysis to Identify and Block Unknown Threats," https://www.paloaltonetworks.com/products/technologies/wildfire.html, Nov. 4, 2014, 1 page.

Wikipedia, "Malware," http://en.wikipedia.org/wiki/Malware, Mar. 27, 2014, 12 pages.

* cited by examiner

MALWARE DETECTION USING INTERNAL MALWARE DETECTION OPERATIONS

RELATED APPLICATION

This application claims priority under 35 U.S.C. §119 to U.S. Provisional Patent Application No. 61/972,554, filed on Mar. 31, 2014, the content of which is incorporated by reference herein in its entirety.

BACKGROUND

Malware, or malicious software, is software used to disrupt computer operations, to gather sensitive information, to gain access to a private computer system, or the like. Malware is a general term used to refer to a variety of forms of hostile or intrusive software, and may include a computer virus, a worm, a trojan horse, a keylogger, spyware, adware, and/or another malicious program.

SUMMARY

A system may determine to perform an internal malware detection operation to detect malware executing on a client device. The system may perform the internal malware detection operation. The internal malware detection operation may be performed locally on a particular device without requiring communication with another device. The system may modify an environment executing on the particular device, to form a modified environment, based on performing the internal malware detection operation. The system may monitor the modified environment for a particular behavior indicative of a malware infection. The system may detect that the particular behavior has occurred. The system may provide a notification that the client device is infected with malware based on detecting that the particular behavior has occurred. The notification may cause one or more network devices to block network traffic to or from the client device.

A computer-readable medium may store one or more instructions that, when executed by one or more processors, cause the one or more processors to determine to perform an internal malware detection operation to detect malware executing on a client device. The one or more instructions may cause the one or more processors to perform the internal malware detection operation. The internal malware detection operation may be performed locally on a particular device without requiring communication with another device. The one or more instructions may cause the one or more processors to modify an environment executing on the particular device, to form a modified environment, based on performing the internal malware detection operation. The one or more instructions may cause the one or more processors to monitor the modified environment for a particular behavior indicative of a malware infection. The one or more instructions may cause the one or more processors to detect that the particular behavior has occurred. The one or more instructions may cause the one or more processors to provide a notification that the client device is infected with malware based on detecting that the particular behavior has occurred. The notification may cause one or more network devices to block network traffic to or from the client device.

A method may include determining, by a particular device, to perform an internal malware detection operation to detect malware executing on a client device. The method may include performing, by the particular device, the internal malware detection operation. The internal malware detection operation may be performed locally on the particular device without requiring communication with another device. The method may include modifying, by the particular device, an environment executing on the particular device, to form a modified environment, based on performing the internal malware detection operation. The method may include monitoring, by the particular device, the modified environment for a particular behavior indicative of a malware infection. The method may include detecting, by the particular device, that the particular behavior has occurred. The method may include providing, by the particular device, a notification that the client device is infected with malware based on detecting that the particular behavior has occurred. The notification may cause one or more network devices to block network traffic to or from the client device.

DETAILED DESCRIPTION

The following detailed description of example implementations refers to the accompanying drawings. The same reference numbers in different drawings may identify the same or similar elements.

Malware can cause serious problems if permitted to execute on a computing system. Some malware detection techniques attempt to detect malware before the malware is installed on a computing system, thus preventing any harmful effects from occurring. However, such techniques may not be capable of detecting all forms of malware. Once the malware has been installed and executed on a computing system, these techniques may not be capable of detecting the malware. Implementations described herein may detect malware after the malware has been installed and executed on a computing system and/or in a malware detection environment.

Figure 1:
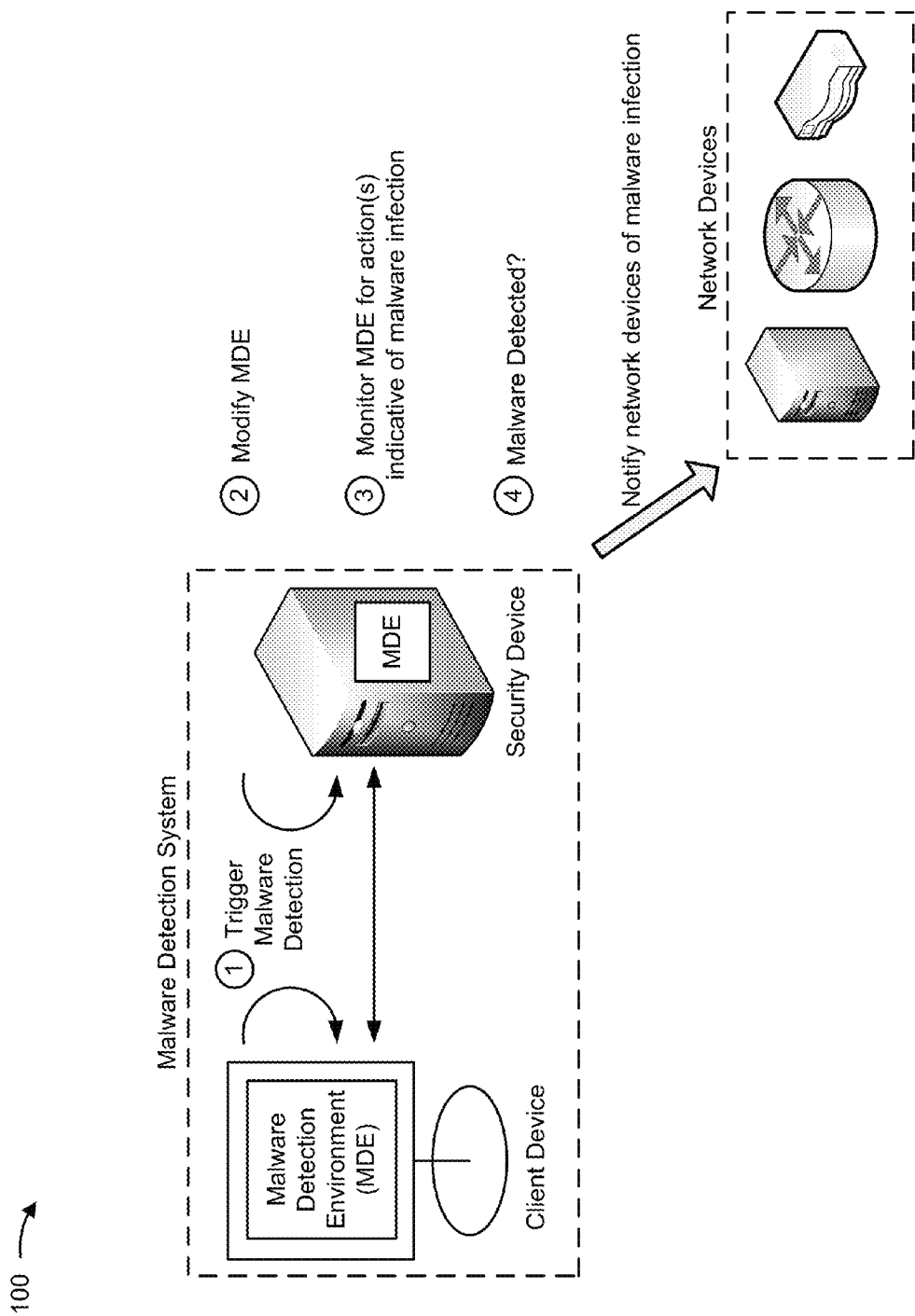
FIG. 1 is a diagram of an overview of an example implementation described herein.

FIG. 1 is a diagram of an overview of an example implementation 100 described herein. As shown in FIG. 1, a malware detection system may include a malware detection environment (MDE) executing on a client device and/or a security device. The security device may provide the client device with access to a network, or may include a device within the network (e.g., a router, a switch, etc.). The MDE may execute on the client device, may execute on the security device, or may execute on both the client device and the security device. The MDE may be triggered to perform a malware detection operation, such as when a suspicious file is downloaded, when suspicious activity occurs, etc. The malware detection operation may cause the MDE to be modified in a manner that attempts to trigger the malware to perform a particular action. The MDE may monitor itself to determine whether the particular action has been performed.

If the MDE determines that the particular action has been performed, then the MDE may determine that a malware infection has occurred. In some implementations, the MDE may perform a combination of different malware detection operations, and may monitor the MDE for a combination of actions. The MDE may determine whether a malware infection has occurred based on the combination of actions. As further shown in FIG. 1, the MDE may notify one or more network devices of the malware infection. In this way, a device infected with malware may be isolated on a network (e.g., traffic to and/or from the device may be blocked), and the malware detection system and/or the MDE may prevent the malware infection from spreading to other devices.

Figure 2:
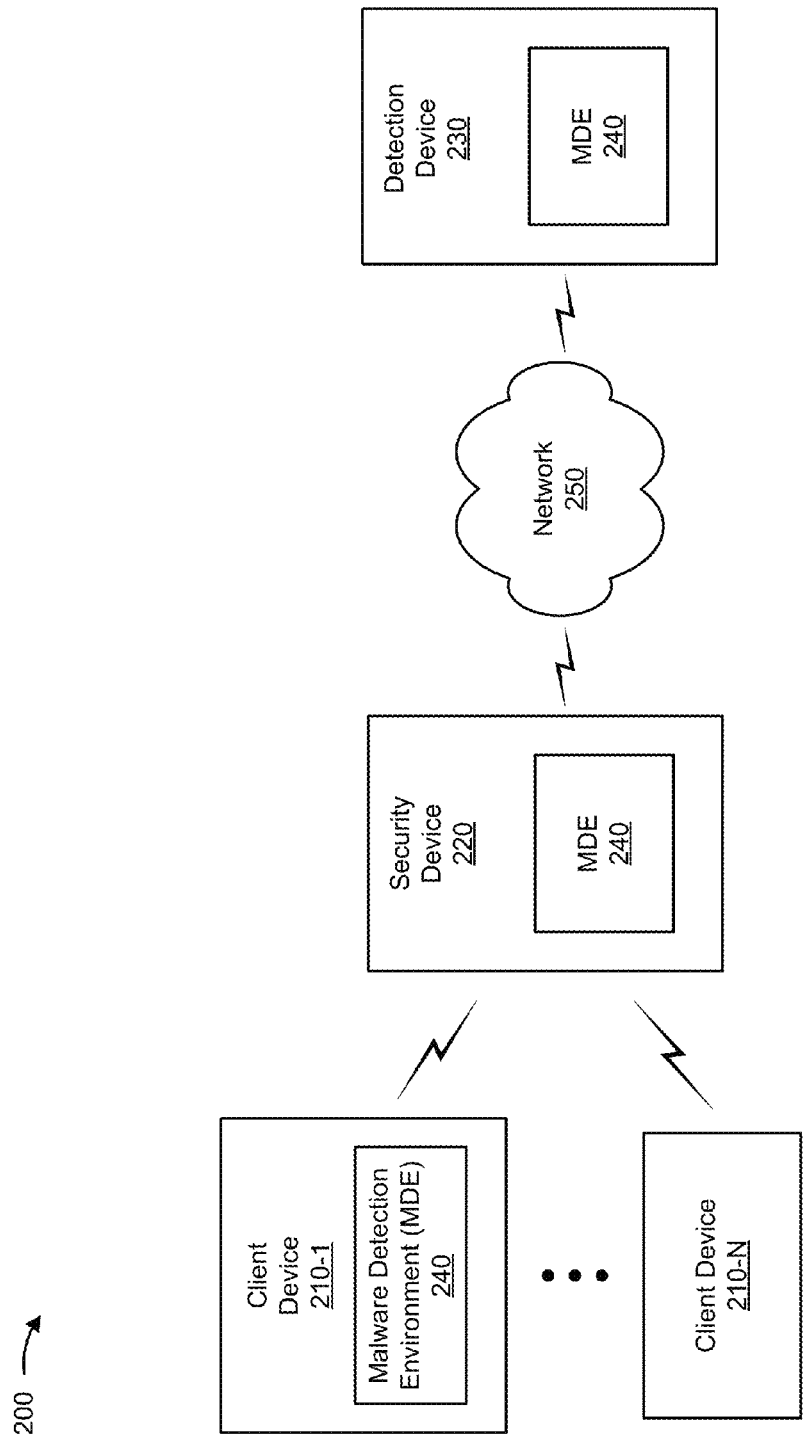
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210-1 through 210-N (N≥1) (hereinafter referred to collectively as "client devices 210," and individually as "client device 210"), a security device 220, a detection device 230, and a network 250. Furthermore, client device 210, security device 220, and/or detection device 230 may include a malware detection environment (MDE) 240. Devices of environment 200 may interconnect via wired connections, wireless connections, or a combination of wired and wireless connections.

Client device 210 may include one or more devices capable of receiving, generating, storing, evaluating, and/or providing information (e.g., over a network) and/or capable of being infected with malware. For example, client device 210 may include a computing device, such as a desktop computer, a workstation computer, a server device, a printer, a laptop computer, a tablet computer, a mobile phone (e.g., a smart phone, a radiotelephone, etc.), or a similar device. In some implementations, client device 210 may receive information from and/or transmit information to security device 220, detection device 230, and/or another device (e.g., via network 250).

Security device 220 may include one or more devices capable of processing and/or transferring traffic between client device 210 and another device (e.g., via network 250). For example, security device 220 may include a network device, such as a reverse proxy, a server (e.g., a proxy server), a traffic transfer device, a gateway, a firewall, a router, a bridge, a hub, a switch, a load balancer, or the like. Security device 220 may be used in connection with a single client device 210 or a group of client devices 210 (e.g., a data center, a private network, etc.). Communications may be routed through security device 220 to reach the group of client devices 210. For example, security device 220 may be positioned within a network as a gateway to a private network that includes the group of client devices 210. Additionally, or alternatively, communications may be encoded such that the communications are routed to security device 220 before being routed to client device 210.

Detection device 230 may include one or more devices capable of receiving and/or providing information over a network (e.g., network 250), and/or capable of generating, storing, and/or processing information received and/or provided over the network. For example, detection device 230 may include a computing device, such as a server device (e.g., a cloud server, an application server, a content server, a host server, a web server, etc.) or a similar device. As an example, detection device 230 may provide a malware detection service in a cloud computing environment. Detection device 230 may receive information from and/or provide information to client device 210 and/or security device 220 (e.g., via network 250). In some implementations, communications destined for client device 210 may be routed to detection device 230 (e.g., via security device 220) for malware detection before being sent to client device 210.

As further shown in FIG. 2, client device 210, security device 220, and/or detection device 230 may host MDE 240. MDE 240 may include a hardware-based component or a combination of hardware and software-based components that provide a computing environment capable of performing one or more malware detection operations. MDE 240 may include, for example, an isolated computing environment (e.g., a sandbox environment) that tests software for malware before permitting the software to be installed and/or executed by another device and/or computing environment (e.g., client device 210). In some implementations, MDE 240 may be customized based on a type of operating system installed on a device on which MDE 240 is executing.

When executing on client device 210, MDE 240 may monitor client device 210 for malware, and may send a notification to security device 220 when malware is detected. This may cause security device 220 to block traffic to and/or from client device 210, and/or to notify other network devices (e.g., a router, a switch, etc.) that client device 210 is infected with malware, causing the other network devices to block traffic to and/or from client device 210. In some implementations, MDE 240 may execute on multiple client devices 210.

When executing on security device 220, MDE 240 may monitor messages and/or communications associated with client device 210 to detect malware on client device 210. If security device 220 detects malware on client device 210, security device 220 may block traffic to and/or from client device 210, and/or may notify other network devices that client device 210 is infected with malware.

Additionally, or alternatively, when executing on security device 220, MDE 240 may execute software requested by client device 210 before providing the software to client device 210. MDE 240 may execute the file in an isolated environment, and may monitor the isolated environment for malware. If MDE 240 determines that the software includes malware, then security device 220 may prevent the software from being provided to client device 210, and may notify client device 210 that the software includes malware. If MDE 240 does not detect malware included in the software (e.g., after a specified period of time), then security device 220 may provide the software to client device 210. Additionally, or alternatively, security device 220 may provide the software to client device 210 before performing malware detection, and may perform malware detection after providing the software to client device 210.

When executing on detection device 230, MDE 240 may operate in a similar manner as when executing on security device 220, except that detection device 230 may provide malware detection as a cloud service (e.g., remote from client device 210 and security device 220). For example, security device 220 may provide suspected malicious software to detection device 230 for malware detection, and may receive a result of the malware detection from detection device 230.

Network 250 may include one or more wired and/or wireless networks. For example, network 250 may include a cellular network, a public land mobile network (PLMN), a local area network (LAN), a wireless local area network (WLAN), a wide area network (WAN), a metropolitan area network (MAN), a telephone network (e.g., the Public Switched Telephone Network (PSTN)), a near field communication (NFC) network, an ad hoc network, an intranet, the Internet, a fiber optic-based network, a cloud computing network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
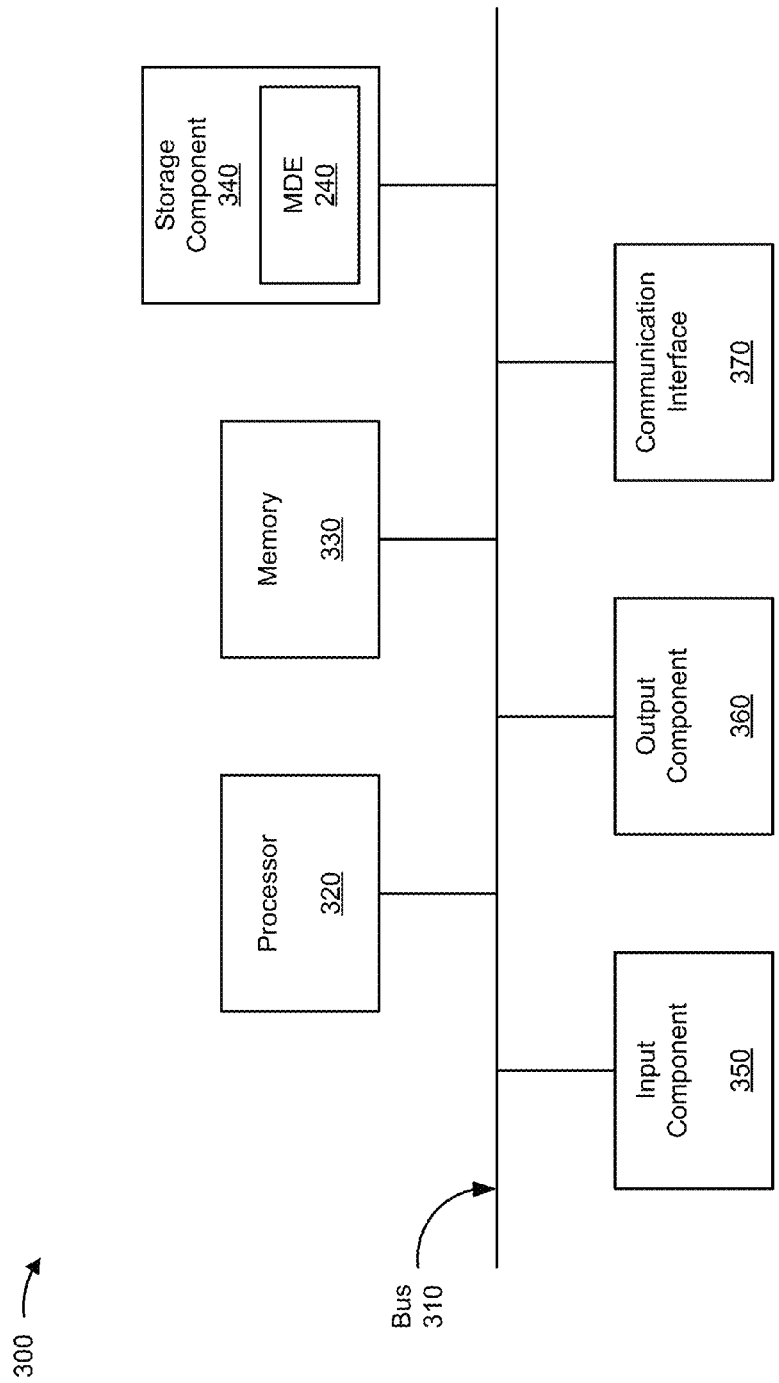
FIG. 3 is a diagram of example components of one or more devices of FIG. 2.

FIG. 3 is a diagram of example components of a device 300. Device 300 may correspond to client device 210, security device 220, and/or detection device 230. In some implementations, client device 210, security device 220, and/or detection device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store MDE 240.

Input component 350 may include a component that permits a user to input information to device 300 (e.g., a touch screen display, a keyboard, a keypad, a mouse, a button, a switch, etc.). Additionally, or alternatively, input component 350 may include a sensor for sensing information (e.g., a global positioning system (GPS) component, an accelerometer, a gyroscope, an actuator, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), etc.

Device 300 may perform one or more processes described herein. Device 300 may perform these processes in response to processor 320 executing software instructions included in a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
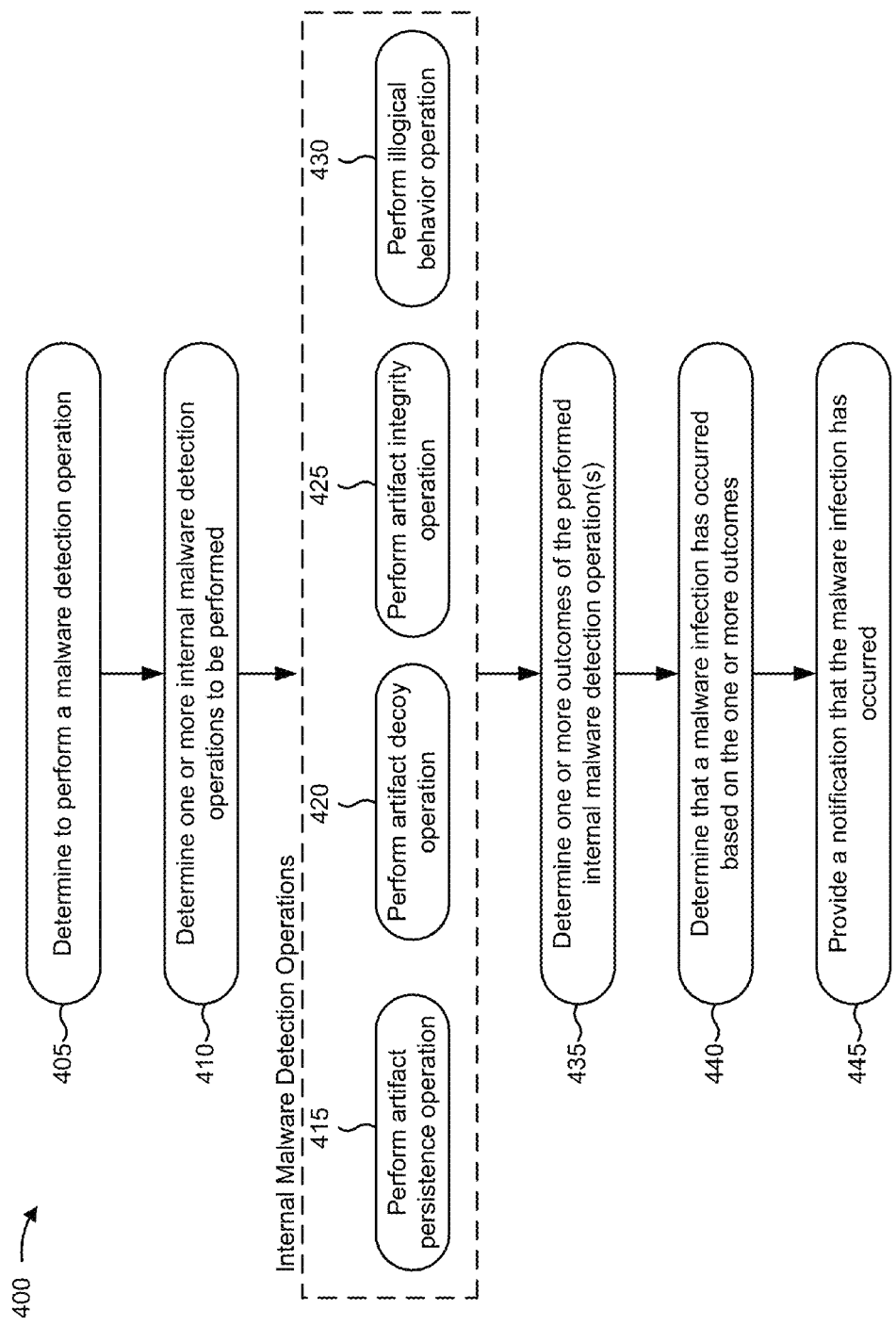
FIG. 4 is a flow chart of an example process for detecting malware using one or more internal malware detection operations.

FIG. 4 is a flow chart of an example process 400 for detecting malware using one or more internal malware detection operations. In some implementations, one or more process blocks of FIG. 4 may be performed by client device 210 (e.g., executing MDE 240). Additionally, or alternatively, one or more process blocks of FIG. 4 may be performed by another device or a group of devices separate from or including client device 210, such as security device 220 and/or detection device 230 (e.g., executing MDE 240).

As shown in FIG. 4, process 400 may include determining to perform a malware detection operation (bock 405). For example, MDE 240 may determine to perform a malware detection operation based on, for example, an indication that software has been requested, downloaded, and/or installed. As an example, a user may provide input to client device 210 (e.g., via an email program, via a web browser, etc.) that causes client device 210 to download software. Additionally, or alternatively, the user may provide input to client device 210 (e.g., via an operating system) that causes client device 210 to install the software. MDE 240 may determine to perform the malware detection operation based on the user input. Additionally, or alternatively, MDE 240 may detect that an automatic software update has occurred, and may trigger the malware detection operation. Additionally, or alternatively, MDE 240 may periodically determine to perform a malware detection operation (e.g., every hour, every day, etc.). Additionally, or alternatively, MDE 240 may determine to perform a malware detection operation based on the occurrence of a particular event, such as a user selection of a link, a request to access a web page, etc.

In some implementations, MDE 240, executing on a first device, may determine to perform the malware detection operation based on input received from a second device. As an example, when client device 210 is executing MDE 240, MDE 240 may determine to perform the malware detection operation based on input received from security device 220, detection device 230, etc. As another example, when security device 220 is executing MDE 240, MDE 240 may determine to perform the malware detection operation based on information received from client device 210, a server associated with network 250, etc. As another example, when detection device 230 is executing MDE 240, MDE 240 may determine to perform the malware detection operation based on information received from client device 210, security device 230, a server associated with network 250, etc.

As further shown in FIG. 4, process 400 may include determining one or more internal malware detection operations to be performed (block 410). For example, MDE 240 may determine the internal malware detection operation(s) to be performed based on user input. For example, a user may provide input to configure MDE 240 to perform one or more internal malware detection operations. Additionally, or alternatively, MDE 240 may determine default internal malware detection operation(s) to perform. In some implementations, MDE 240 may determine the malware detection operation(s) to perform based on a characteristic associated with a device on which MDE 240 is operating (e.g., an operating system executing on the device, an amount of computing resources associated with the device, etc.). Additionally, or alternatively, MDE 240 may determine the malware detection operation(s) to perform based on a characteristic associated with the software to be tested for malware (e.g., a type of software, a type of file, etc.).

An internal malware detection operation may refer to a malware detection operation that can be performed by MDE 240 on a first device without communicating with a second device. When performing an internal malware detection operation, MDE 240 may monitor an environment (e.g., MDE 240), executing on a device, for behavior indicative of a malware infection. In some implementations, MDE 240 may modify the environment, and may monitor the modified environment for behavior indicative of a malware infection. When performing an internal malware detection operation on a first device, the modifying and/or monitoring may not involve communicating with a second device.

As an example, an internal malware detection operation may include an artifact persistence operation, an artifact decoy operation, an artifact integrity operation, and/or an illogical behavior operation, as described below. MDE 240 may perform a single malware detection operation, or may perform any combination of multiple malware detection operations. When performing a combination of multiple malware detection operations, MDE 240 may perform the multiple malware detection operations in any order. Additionally, or alternatively, MDE 240 may perform the multiple malware detection operations in series or in parallel (e.g., concurrently).

As further shown in FIG. 4, process 400 may include performing an artifact persistence operation (block 415). For example, MDE 240 may perform an artifact persistence operation by monitoring a particular area (e.g., a sensitive area in memory) of an operating system to determine when a new artifact has been created. An artifact may refer to any information stored by a device, such as a file, a script, an object, an instruction, a process, a thread, a registry value, a state variable, a configuration, a bookmark, a user identifier, information within a file, etc.

When MDE 240 determines that a new artifact has been created, MDE 240 may delete and/or terminate the artifact. MDE 240 may wait for a threshold amount of time to determine whether the artifact has been recreated. If MDE 240 determines that the artifact was recreated (e.g., within the threshold amount of time), then MDE 240 may determine that a malware infection has occurred. Additionally, or alternatively, MDE 240 may modify a malware detection score in a manner that indicates an increased likelihood that a malware infection has occurred.

If MDE 240 determines that the artifact was not recreated (e.g., within the threshold amount of time), then MDE 240 may recreate the artifact, and may not reach a conclusion regarding whether a malware infection has occurred. Additionally, or alternatively, MDE 240 may modify a malware detection score in a manner that indicates a decreased likelihood that a malware infection has occurred.

As an example, assume that MDE 240 monitors environment variables defined by an operating system executing on client device 210. Assume that MDE 240 determines that a new environment variable has been created, and that MDE 240 deletes the new environment variable and waits two minutes for the environment variable to be recreated. If MDE 240 determines that the environment variable has been recreated before the two minutes elapse, then MDE 240 may determine that client device 210 is infected with malware. If MDE 240 determines that the environment variable has not been recreated before the two minutes elapse, then MDE 240 may recreate the environment variable (e.g., since the environment variable was likely not created by malware), and may determine that the artifact persistence operation was inconclusive about whether client device 210 is infected with malware.

As further shown in FIG. 4, process 400 may include performing an artifact decoy operation (block 420). For example, MDE 240 may perform an artifact decoy operation by creating an artifact (e.g., a decoy artifact) on an operating system and monitoring the artifact for activity indicative of a malware infection. MDE 240 may store information that identifies one or more activities indicative of a malware infection. MDE 240 may create the artifact in a particular location of the operating system, such as a location that a user is unlikely to explore and/or modify. Thus, if the artifact is modified, such modification may be indicative of a malware infection.

If MDE 240 determines that the artifact was modified (e.g., within a threshold amount of time, such as an hour, a day, a week, a month, a year, etc.), then MDE 240 may determine that a malware infection has occurred. Additionally, or alternatively, MDE 240 may modify a malware detection score in a manner that indicates an increased likelihood that a malware infection has occurred. If MDE 240 determines that the artifact was not modified (e.g., within the threshold amount of time), then MDE 240 may not reach a conclusion regarding whether a malware infection has occurred. Additionally, or alternatively, MDE 240 may modify a malware detection score in a manner that indicates a decreased likelihood that a malware infection has occurred.

As an example, assume that MDE 240 creates a decoy text document in a special folder in a user's root home directory of an operating system executing on client device 210. Typically, users do not explore the root home directory, so a user is unlikely to modify the decoy text document. Assume that MDE 240 monitors the decoy text document for a modification, such as a modification of the contents of the document, a deletion of the document, a movement of the document to a different location, etc. If MDE 240 determines that the decoy text document has been modified, then MDE 240 may determine that client device 210 is infected with malware. If the decoy text document remains unmodified, then MDE 240 may determine that the artifact decoy operation was inconclusive about whether client device 210 is infected with malware. In some implementations, MDE 240 may delete the decoy text document after a threshold amount of time has passed.

As another example, assume that MDE 240 creates a decoy secure shell (SSH) server associated with a particular port on client device 210 (e.g., port 22). If client device 210 (e.g., a local host) attempts to connect to the decoy SSH server, then MDE 240 may determine that client device 210 is infected with malware. If no connection attempts to the decoy SSH server are made, then MDE 240 may determine that the artifact decoy operation was inconclusive about whether client device 210 is infected with malware. Additionally, or alternatively, MDE 240 may monitor for a connection from another client devices 210, which may indicate that the connecting client device 210 is infected with malware.

As further shown in FIG. 4, process 400 may include performing an artifact integrity operation (block 425). For example, MDE 240 may perform an artifact integrity operation by monitoring an existing artifact for activity indicative of a malware infection. If MDE 240 determines that the artifact was modified in a particular manner, then MDE 240 may determine that a malware infection has occurred. Additionally, or alternatively, MDE 240 may modify a malware detection score in a manner that indicates an increased likelihood that a malware infection has occurred. As long as the artifact remains unmodified, then MDE 240 may not reach a conclusion regarding whether a malware infection has occurred. Additionally, or alternatively, if the artifact remains unmodified for a particular amount of time, then MDE 240 may modify a malware detection score in a manner that indicates a decreased likelihood that a malware infection has occurred. In some implementations, MDE 240 may modify the existing artifact before monitoring the existing artifact for the activity indicative of a malware infection.

As an example, MDE 240 may insert fake log statements into a system log file of client device 210. Because the log statements are fake, the log statements are unlikely to be modified by legitimate software. However, malware may alter or delete log files in an attempt to hide malicious activity performed by the malware. Thus, if MDE 240 detects that a fake log statement has been modified (e.g., altered, deleted, etc.), then MDE 240 may determine that client device 210 is infected with malware. If the fake log statements remain unmodified, then MDE 240 may determine that the artifact integrity operation was inconclusive about whether client device 210 is infected with malware.

As another example, MDE 240 may add fake configuration properties to a system configuration file of client device 210. Because the configuration properties are fake, client device 210 will be unaware of the configuration properties, and the configuration properties will not impact a functionality of client device 210. If MDE 240 detects that a fake configuration property has been modified (e.g., altered, deleted, etc.), then MDE 240 may determine that client device 210 is infected with malware. If the fake configuration properties remain unmodified, then MDE 240 may determine that the artifact integrity operation was inconclusive about whether client device 210 is infected with malware.

As further shown in FIG. 4, process 400 may include performing an illogical behavior operation (block 430). For example, MDE 240 may perform an illogical behavior operation by monitoring an environment for a particular illogical behavior. MDE 240 may store information that identifies one or more illogical behaviors. An illogical behavior may refer to a behavior unlikely to be performed by legitimate software (e.g., because the behavior is unreliable, insecure, risky, etc.). If MDE 240 determines that an illogical behavior has occurred, then MDE 240 may determine that a malware infection has occurred. Additionally, or alternatively, MDE 240 may modify a malware detection score in a manner that indicates an increased likelihood that a malware infection has occurred. As long as an illogical behavior does not occur, then MDE 240 may not reach a conclusion regarding whether a malware infection has occurred. Additionally, or alternatively, if no illogical behaviors occur for a particular amount of time, then MDE 240 may modify a malware detection score in a manner that indicates a decreased likelihood that a malware infection has occurred.

As an example, MDE 240 may monitor newly created shortcuts on an operating system executing on client device 210. MDE 240 may resolve a shortcut to a target location to which the shortcut points. If the shortcut points to a file in a particular location, such as a recycle bin that temporarily stores deleted files, then MDE 240 may determine that client device 210 is infected with malware. Because files stored in the recycle bin are likely to be deleted, creating a shortcut to a file (e.g., a binary file) stored in the recycle bin would be illogical (e.g., unreliable) behavior. However, malware may perform this behavior to hide a malicious file.

As further shown in FIG. 4, process 400 may include determining one or more outcomes of the performed internal malware detection operation(s) (block 435), and determining that a malware infection has occurred based on the one or more outcomes (block 440). For example, MDE 240 may determine whether one or more outcomes indicate that malware was detected. In some implementations, MDE 240 may detect a malware infection based on the outcome of a single internal malware detection operation.

In some implementations, MDE 240 may detect a malware infection based on outcomes associated with multiple internal malware detection operations (e.g., when multiple internal malware detection operations indicate that a device is infected with malware). For example, if a threshold quantity of internal malware detection operations indicate a malware infection, then MDE 240 may determine that a malware infection has occurred. Additionally, or alternatively, if a particular combination of internal malware detection operations indicate a malware infection (e.g., the artifact integrity operation and the artifact persistence operation), then MDE 240 may determine that a malware infection has occurred.

In some implementations, MDE 240 may calculate a malware detection score based on the outcome(s) of one or more internal malware detection operations. An outcome associated with a particular internal malware detection operation may indicate a malware infection, may indicate no malware infection, may indicate an inconclusive result, may indicate a degree of confidence of a malware infection (e.g., based on detecting different types of modifications, behaviors, activities, etc.), or the like. MDE 240 may determine an individual malware detection score for the particular internal malware detection operation based on the outcome (e.g., a value of 1 for a malware infection, a value of 0 for an inconclusive result, a value within the range of 0 and 1 for a degree of confidence, etc.). MDE 240 may determine that a malware infection has occurred if the individual malware detection score satisfies a threshold value.

Additionally, or alternatively, MDE 240 may combine individual malware detection scores for multiple internal malware detection operations to generate an overall malware detection score (e.g., by adding the scores, multiplying the scores, etc.). In some implementations, MDE 240 may apply different weight values to the different outcomes to generate the overall malware detection score. MDE 240 may determine that a malware infection has occurred if the overall malware detection score satisfies a threshold value.

As further shown in FIG. 4, process 400 may include providing a notification that the malware infection has occurred (block 445). For example, MDE 240 may provide, to a device executing MDE 240, a notification that a malware infection has occurred. Assume that client device 210 is executing MDE 240, and MDE 240 detects malware on client device 210. MDE 240 may provide information identifying software (e.g., an executable file) that includes the malware, causing client device 210 to delete the file, prevent a download of the file, etc.

Additionally, or alternatively, MDE 240 may provide, to a different device than the device executing MDE 240 (e.g., that discovered the malware infection), an indication that the malware infection has occurred. For example, assume that client device 210 is executing MDE 240, and MDE 240 detects a malware infection on client device 210. In this case, MDE 240 may notify security device 220 that client device 210 is infected with malware, and may provide information identifying client device 210 (e.g., a network address). In this case, security device 220 may prevent client device 210 from communicating with other devices in network 250 (e.g., a server device associated with network 250) and/or may prevent other devices from communicating with client device 210.

As another example, if MDE 240 determines that client device 210 is infected with malware, then MDE 240 may provide a network device (e.g., a switch, a router, a firewall, etc.) with the local Internet Protocol (IP) address and/or a media access control (MAC) address of client device 210. The network device may block network traffic to and from client device 210, and may provide a notification (e.g., via email) to a user associated with client device 210, indicating that client device 210 has been infected. In this way, MDE 240 may prevent the malware infection from spreading, and may notify users of malware infections.

In some implementations, security device 220 may determine whether client device 210 is infected with malware before granting client device 210 access to a network (e.g., a private network) protected by security device 220. For example, client device 210 may be required to provide one or more malware detection outcomes to security device 220 when client device 210 enters a proximity of a private network (e.g., a WLAN network) and/or to undergo testing (e.g., by security device 220) to determine one or more malware detection outcomes. Security device 220 may determine whether the outcomes indicate a malware infection. If the outcomes do not indicate a malware infection, then security device 220 may grant client device 210 access to the private network. If the outcomes indicate a malware infection, then security device 220 may deny client device 210 access to the private network. Additionally, or alternatively, security device 220 may transmit an email message to an email address of a user of client device 210, an information technology person associated with client device 210, or the like.

In some implementations, some blocks of process 400 (e.g., blocks 405-430) may be performed during an initial installation of malware detection software on a device (e.g., client device 210, security device 220, etc.), during an upgraded installation, etc. Additionally, or alternatively, some blocks of process 400 may occur periodically and/or continuously as the device is used (e.g., by detecting malware as the device is operating).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of detecting malware using one or more internal malware detection operations.

Figure 5A:
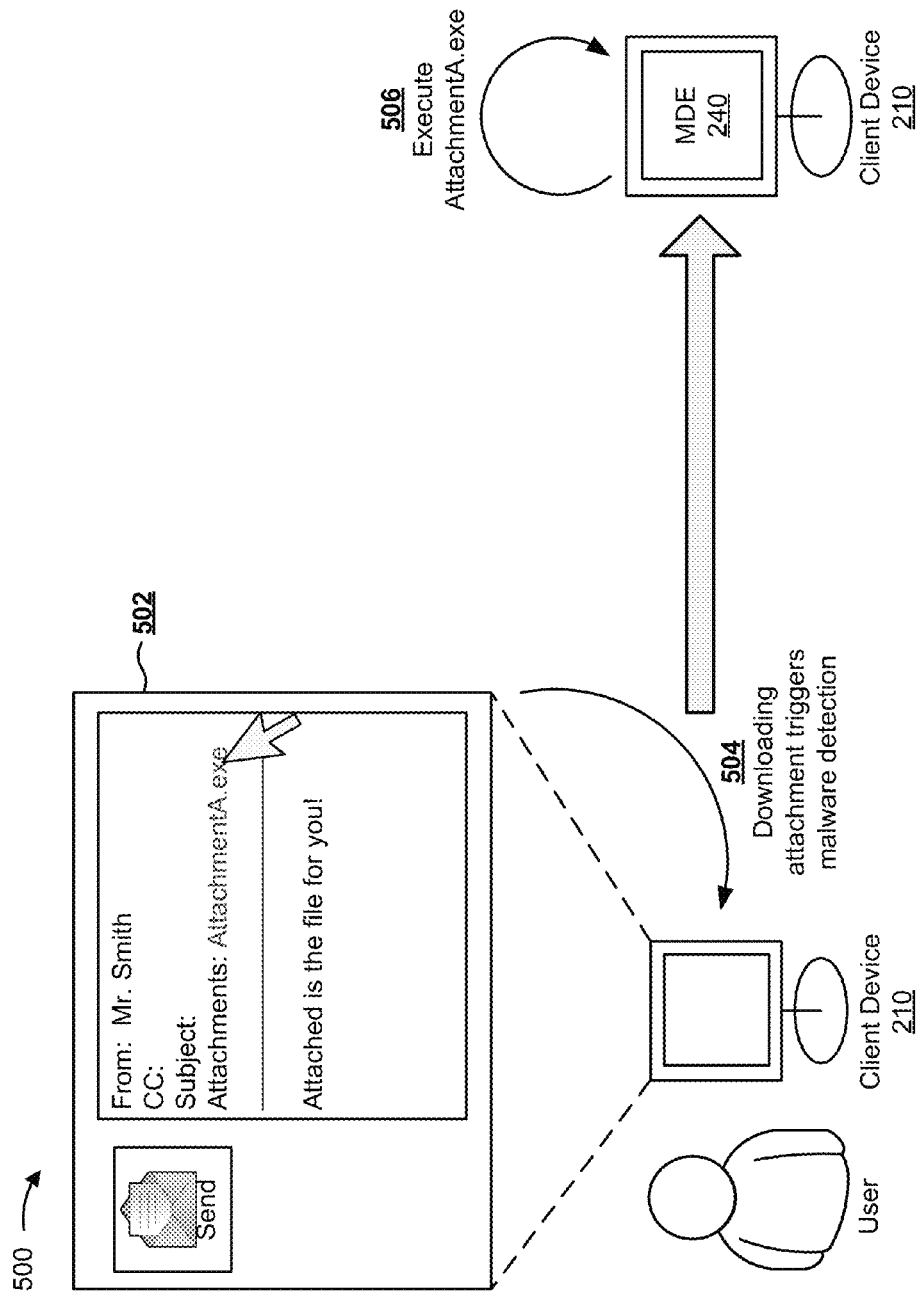
FIGS. 5A-5F are diagrams of an example implementation relating to the example process shown in FIG. 4.

As shown in FIG. 5A, and by reference number 502, assume that a user interacts with client device 210 to download an email attachment, shown as Attachment A. As shown by reference number 504, assume that downloading Attachment A causes client device 210 to trigger a malware detection operation. As shown by reference number 506, assume that client device 210, which is executing MDE 240, executes Attachment A to install a software program. In some implementations, the software program may be installed in an isolated environment of MDE 240.

Figure 5B:
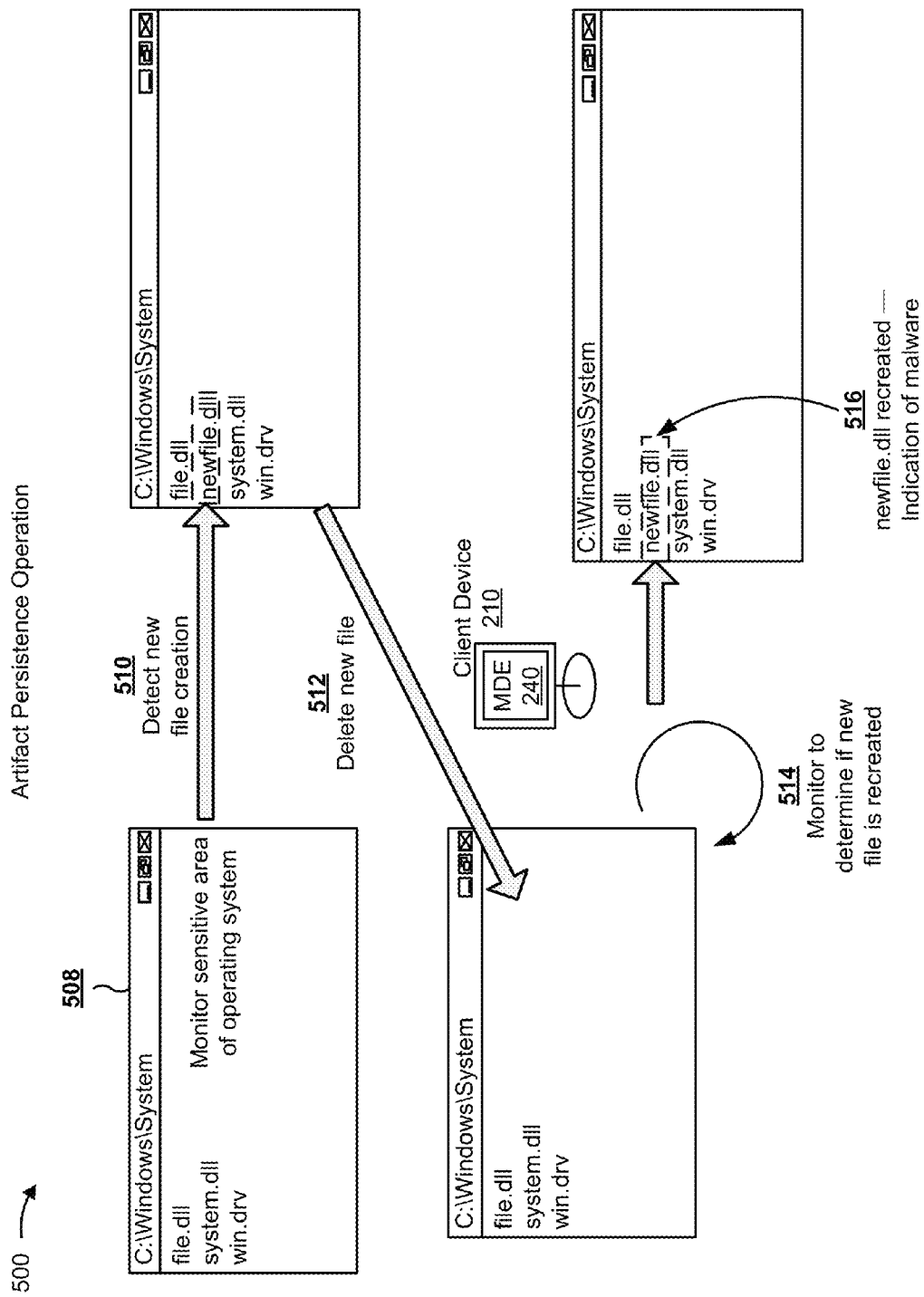

FIG. 5B shows an example artifact persistence operation performed by client device 210 (e.g., executing MDE 240). As shown by reference number 508, assume that client device 210 monitors a sensitive area of an operating system, shown as a system folder labeled "C:\Windows\System," for modifications. As shown by reference number 510, assume that client device 210 detects that a new file, shown as "newfile.dll" has been created in the system folder. As shown by reference number 512, assume that client device 210 deletes the new file. As shown by reference number 514, assume that client device 210 monitors the sensitive area (e.g., the system folder) to determine whether the new file has been recreated. As shown by reference number 516, assume that client device 210 detects that the new file, again shown as "newfile.dll," has been recreated. This action indicates that client device 210 has been infected with malware because users and legitimate software programs are unlikely to recreate this file, and malware may hide a malicious file in this sensitive area.

Figure 5C:
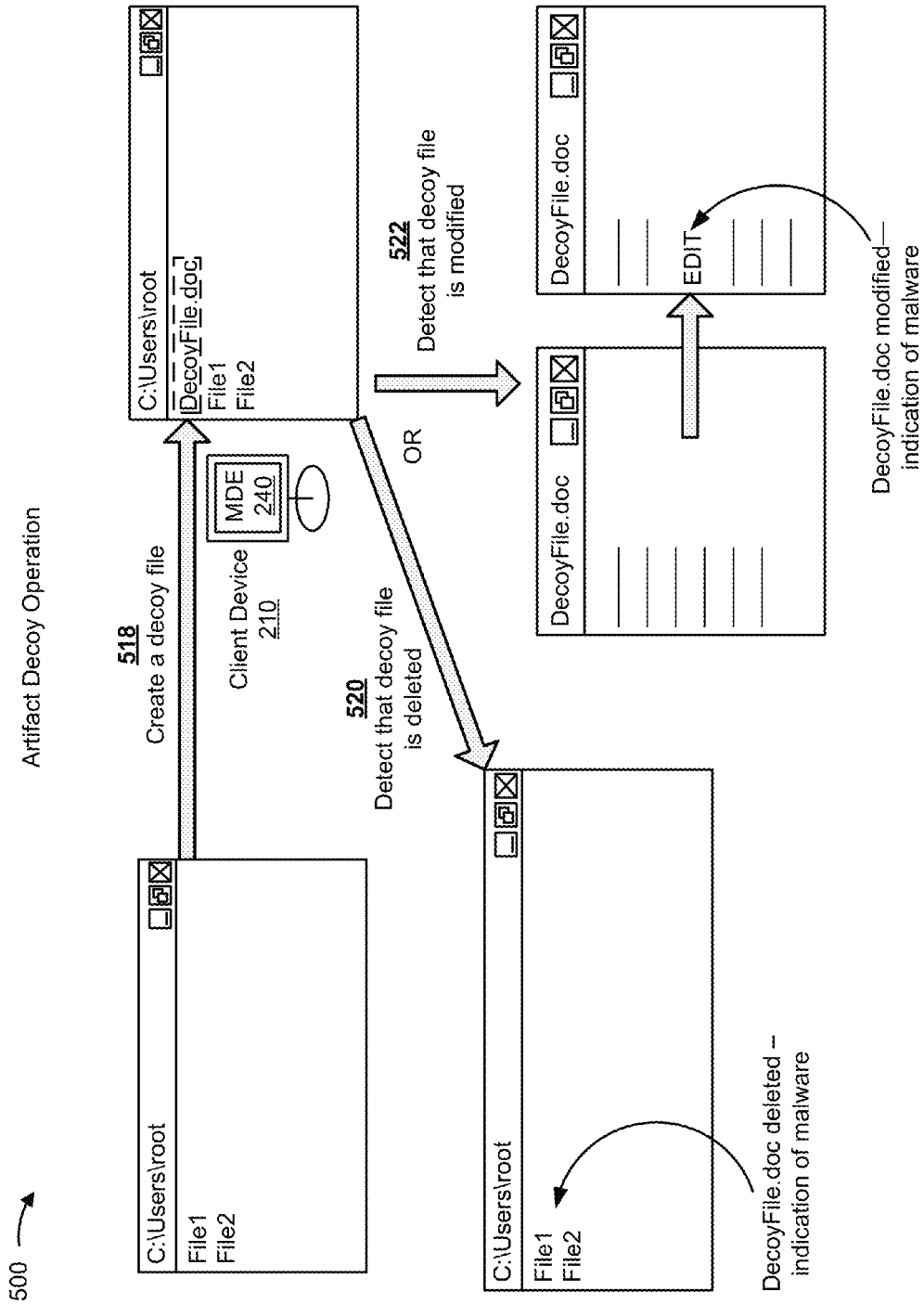

FIG. 5C shows an example artifact decoy operation performed by client device 210. As shown by reference number 518, assume that client device 210 creates a decoy file, shown as "DecoyFile.doc," in a particular location unlikely to be edited by a user (e.g., a root directory of the user's home directory). As shown by reference number 520, assume that client device 210 detects that the decoy file has been deleted, which indicates that client device 210 has been infected with malware. As another example, and as shown by reference number 522, assume that client device 210 detects that the text in the decoy file has been modified. This action indicates that client device 210 has been infected with malware because users and legitimate software programs are unlikely to modify a file stored in this location.

Figure 5D:
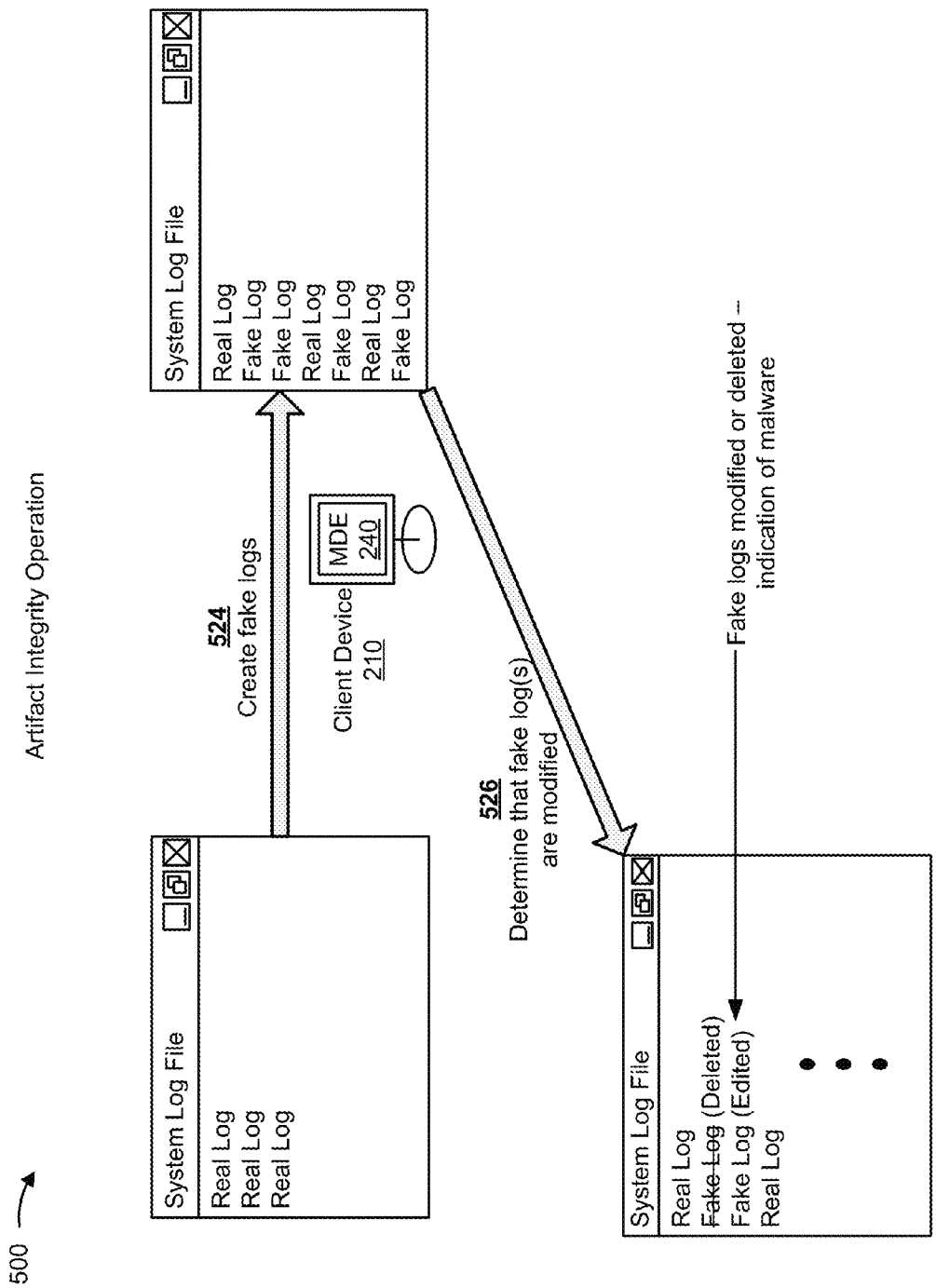

FIG. 5D shows an example artifact integrity operation performed by client device 210. As shown by reference number 524, assume that client device 210 creates fake logs in a system log file that also contains real logs. As shown by reference number 526, assume that client device 210 detects that the fake logs have been modified, such as by detecting that a fake log has been edited or deleted. This action indicates that client device 210 has been infected with malware because users and legitimate software are unlikely to modify fake logs, while malware may delete or edit log files (e.g., not distinguishing real logs from fake logs) to hide malicious activity performed by the malware.

Figure 5E:
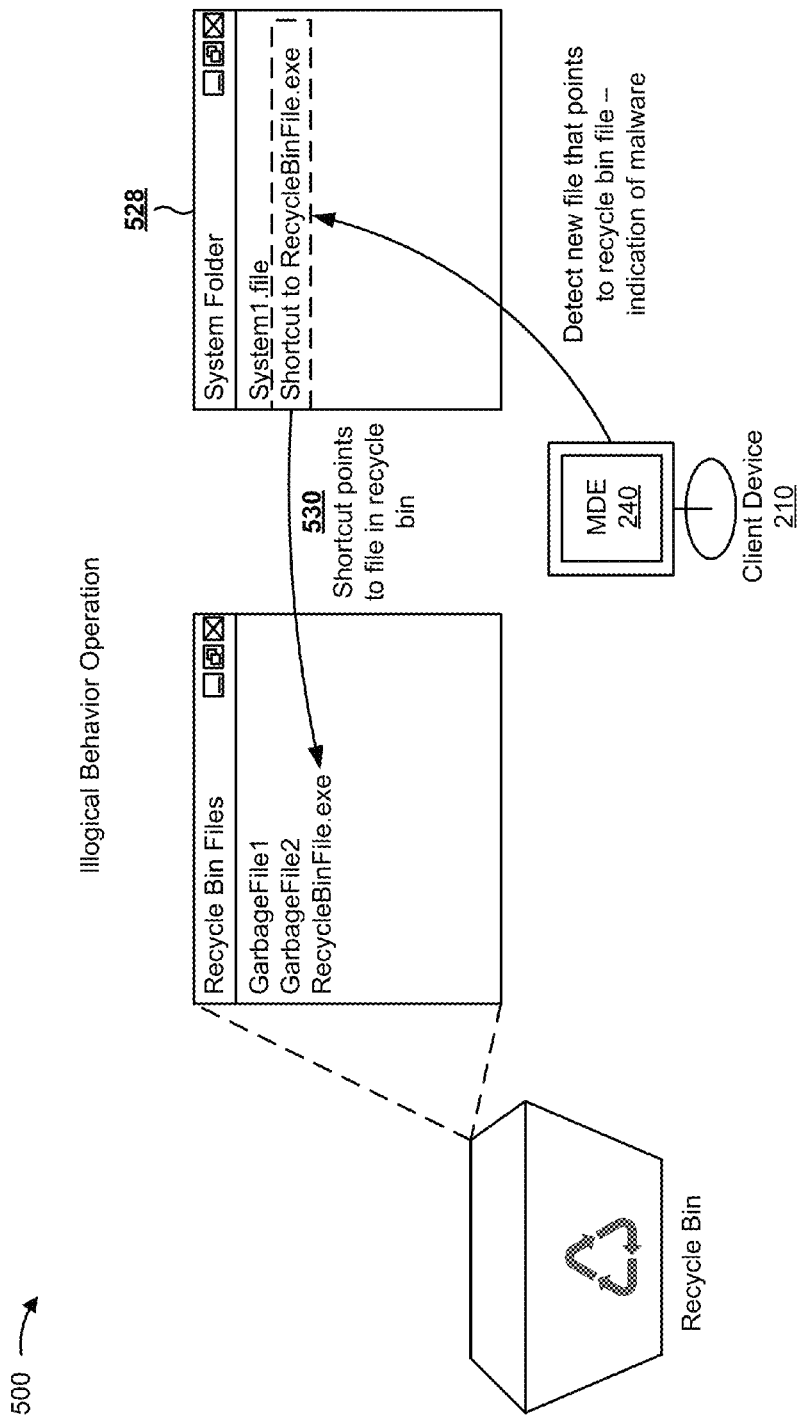

FIG. 5E shows an example illogical behavior operation performed by client device 210. As shown by reference number 528, assume that client device 210 monitors a sensitive area, shown as a system folder, and determines that a new shortcut has been created in the sensitive area. As shown by reference number 530, assume that client device 210 determines that the shortcut points to a binary file stored in the recycling bin. This action indicates that client device 210 has been infected with malware because users and legitimate software are unlikely to create new shortcuts to files stored in the recycling bin, since these files are likely to be deleted. However, malware may perform this action to hide a malicious file from the user.

Figure 5F:
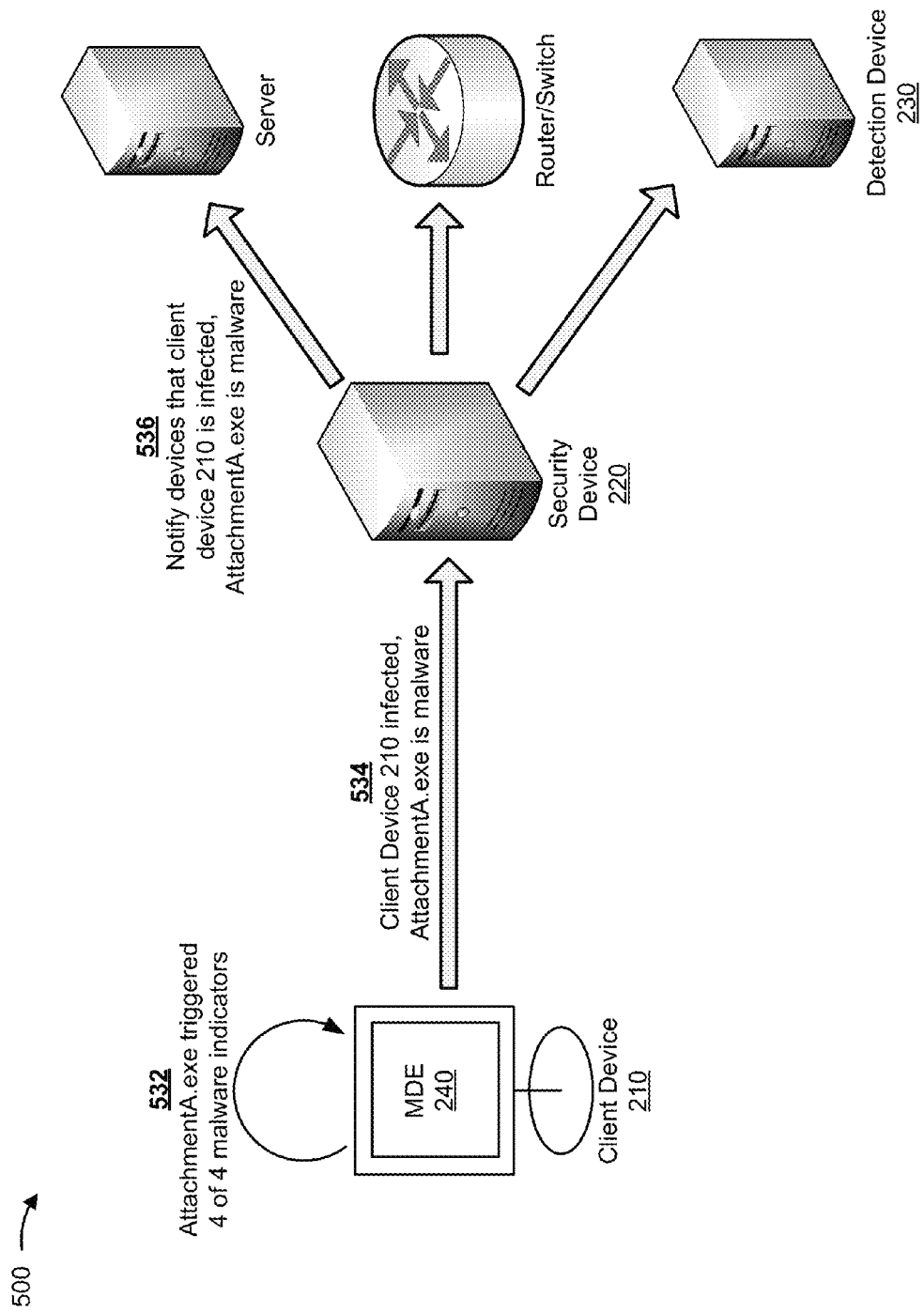

As shown in FIG. 5F, and by reference number 532, assume that client device 210 determines that four out of four internal malware detection operations indicate that client device 210 is infected with malware and/or that Attachment A is malware. For example, assume that an artifact persistence operation, an artifact decoy operation, an artifact integrity operation, and an illogical behavior operation all indicate that client device 210 is infected with malware, as shown in FIGS. 5B-5E. Assume that this quantity of indications (e.g., four) satisfies a threshold, and that client device 210 provides an indication of the malware infection to security device 220, as shown by reference number 534. As shown by reference number 536, assume that security device 220 notifies other network devices that client device 210 is infected, causing these devices to drop traffic from client device 210 and/or prevent traffic from being sent to client device 210. Additionally, or alternatively, client device 210 may provide the indication of the malware infection to the network devices. In this way, MDE 240 may prevent the malware infection from spreading to other devices.

In example implementation 500, MDE 240 is shown as executing on client device 210, and client device 210 is shown as performing the internal malware detection operations. In some implementations, security device 220 and/or detection device 230 may execute MDE 240 and may perform some or all of the internal malware detection operations. For example, client device 210 may provide, to security device 220, an indication that a user has requested to download Attachment A. Security device 220 may download and install Attachment A (e.g., in a secure, isolated environment, such as MDE 240), and may determine whether Attachment A includes malware. If security device 220 determines that Attachment A includes malware, then security device 220 may prevent Attachment A from being provided to client device 210. Additionally, or alternatively, security device 220 may notify other network devices that Attachment A includes malware (e.g., and/or may identify a source address associated with Attachment A), and the other network devices may prevent Attachment A from being downloaded and/or installed. If security device 220 determines that Attachment A does not include malware (e.g., if a particular amount of time elapses without a malware infection being detected), then security device 220 may provide Attachment A to client device 210.

As indicated above, FIGS. 5A-5F are provided merely as an example. Other examples are possible and may differ from what was described with regard to FIGS. 5A-5F.

Figure 6:
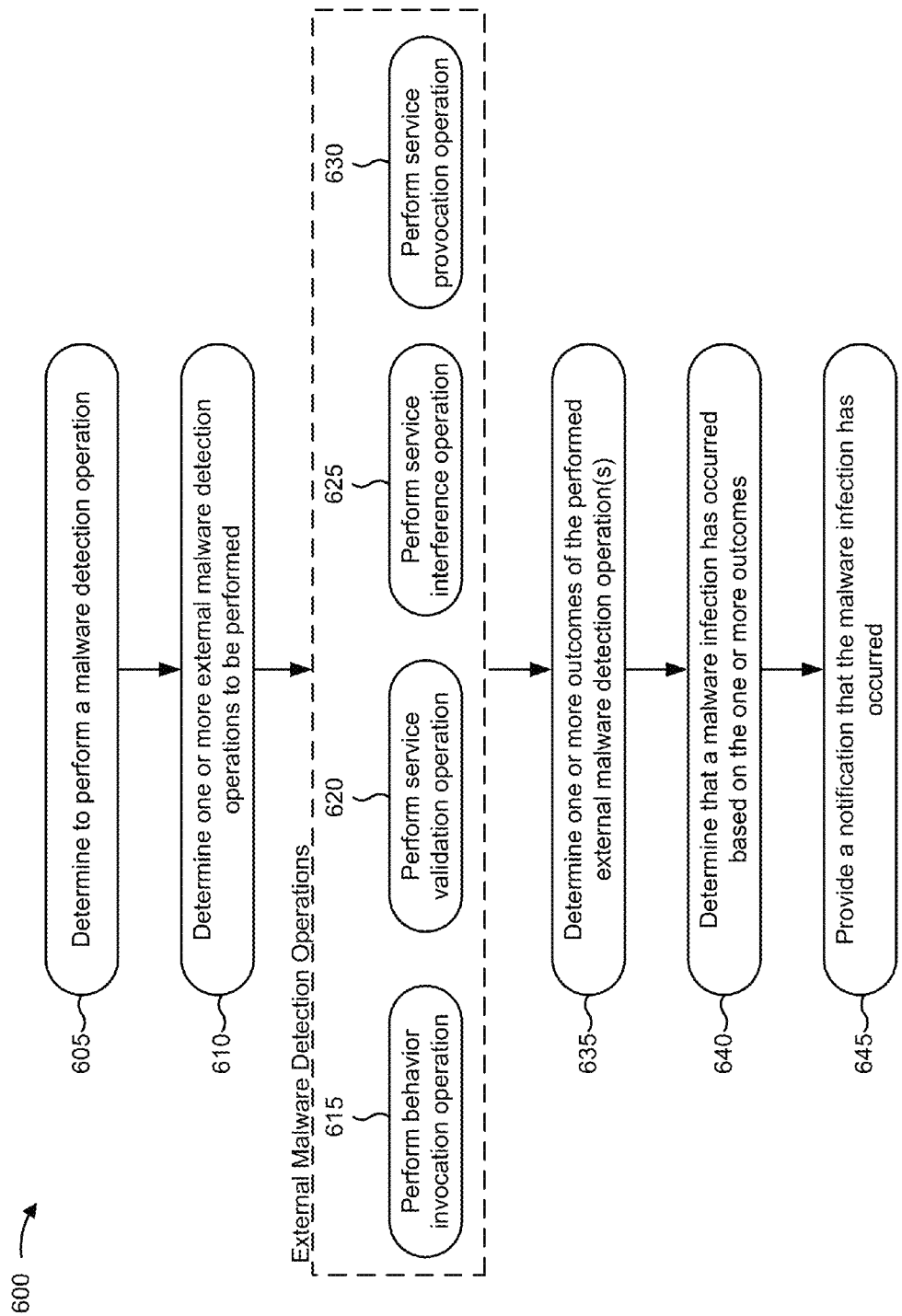
FIG. 6 is a flow chart of an example process for detecting malware using one or more external malware detection operations.

FIG. 6 is a flow chart of an example process 600 for detecting malware using one or more external malware detection operations. In some implementations, one or more process blocks of FIG. 6 may be performed by security device 220 (e.g., executing MDE 240). Additionally, or alternatively, one or more process blocks of FIG. 6 may be performed by another device or a group of devices separate from or including security device 220, such as client device 210 and/or detection device 230 (e.g., executing MDE 240).

As shown in FIG. 6, process 600 may include determining to perform a malware detection operation (bock 605). For example, MDE 240 may determine to perform a malware detection operation as described herein in connection with block 405 of FIG. 4.

As further shown in FIG. 6, process 600 may include determining one or more external malware detection operations to be performed (block 610). For example, MDE 240 may determine the external malware detection operation(s) to be performed based on user input. For example, a user may provide input to configure MDE 240 to perform one or more external malware detection operations. Additionally, or alternatively, MDE 240 may determine default external malware detection operation(s) to perform. In some implementations, MDE 240 may determine the malware detection operation(s) to perform based on a characteristic associated with a device on which MDE 240 is operating (e.g., an operating system executing on the device, an amount of computing resources associated with the device, etc.). Additionally, or alternatively, MDE 240 may determine the malware detection operation(s) to perform based on a characteristic associated with the software to be tested for malware (e.g., a type of software, a type of file, etc.).

An external malware detection operation may refer to a malware detection operation, performed by MDE 240 on a first device, that involves communicating with a second device (e.g., by transmitting a message to and/or receiving a message from the second device). When performing an external malware detection operation, MDE 240 may monitor a communication and/or a result caused by the communication for behavior indicative of a malware infection. In some implementations, MDE 240 may modify the communication, and may monitor the modified communication and/or a result caused by the modified communication for behavior indicative of a malware infection. When performing an external malware detection operation on a first device, the modifying and/or monitoring may involve communicating with a second device.

As an example, an external malware detection operation may include a behavior invocation operation, a service validation operation, a service interference operation, and/or a service provocation operation, as described below. MDE 240 may perform a single malware detection operation, or may perform any combination of multiple malware detection operations. When performing a combination of multiple malware detection operations, MDE 240 may perform the multiple malware detection operations in any order. Additionally, or alternatively, MDE 240 may perform the multiple malware detection operations in series or in parallel (e.g., concurrently).

As further shown in FIG. 6, process 600 may include performing a behavior invocation operation (block 615). For example, MDE 240 may perform a behavior invocation operation by attempting to invoke a particular behavior from an artifact on a device being monitored for malware (e.g., client device 210, security device 220, etc.). If the particular behavior cannot be invoked (e.g., is not detected by MDE 240), then MDE 240 may determine that a malware infection has occurred. Additionally, or alternatively, MDE 240 may modify a malware detection score in a manner that indicates an increased likelihood that a malware infection has occurred. If the particular behavior can be invoked (e.g., is detected by MDE 240), then MDE 240 may not reach a conclusion regarding whether a malware infection has occurred. Additionally, or alternatively, if the particular behavior is invoked and/or detected, then MDE 240 may modify a malware detection score in a manner that indicates a decreased likelihood that a malware infection has occurred. MDE 240 may store information that identifies behaviors that, when invoked or not invoked, are indicative of a malware infection.

As an example, MDE 240 may monitor open ports of a device being monitored for malware to detect when a new SSH server is established on the device. If a new SSH server is established, then MDE 240 may attempt to establish an SSH session with the SSH server via an SSH handshake (e.g., between a local host on the device and the SSH server on a particular port, such as port 22). If the SSH handshake is not successful, then MDE 240 may determine that the device is infected with malware. Additionally, or alternatively, if the SSH handshake is successful, but a request from the device (e.g., a local host) to the SSH server causes the SSH server to send a response that is incorrectly formatted, then MDE 240 may determine that the device is infected with malware. If the SSH handshake is successful and an SSH session is fully established (e.g., via an SSH handshake with a properly formatted response), then MDE 240 may determine that the behavior invocation operation was inconclusive about whether the device is infected with malware.

As another example, MDE 240 may monitor outbound connection attempts to determine whether any outbound connection attempts have been established on a particular port, such as port 80, which is typically used for HyperText Transfer Protocol (HTTP) messages. If MDE 240 detects an outbound connection, on the particular port, to a particular server, then MDE 240 may attempt to establish a connection with the particular server. If the connection is unsuccessful, or if the connection does not follow HTTP specifications, then MDE 240 may determine that the device is infected with malware. If the connection is successful and follows HTTP specifications, then MDE 240 may determine that the behavior invocation operation was inconclusive about whether the device is infected with malware.

While described above as an external malware detection operation, in some implementations, the behavior invocation operation may be an internal malware detection operation. In other words, MDE 240, executing on a first device, may attempt to invoke a particular behavior without communicating with a second device.

As further shown in FIG. 6, process 600 may include performing a service validation operation (block 620). For example, MDE 240 may perform a service validation operation by validating a type of service being requested by a device being monitored for malware. For example, MDE 240 may attempt to validate a connection between the device and a server, and may exchange messages that test the various features of a protocol being used to interact with the server. If the connection fails or the server does not support the protocol, then MDE 240 may determine that a malware infection has occurred. Additionally, or alternatively, MDE 240 may modify a malware detection score in a manner that indicates an increased likelihood that a malware infection has occurred. If the connection is successfully validated (e.g., the server passes the tests), then MDE 240 may not reach a conclusion regarding whether a malware infection has occurred, or may modify a malware detection score in a manner that indicates a decreased likelihood that a malware infection has occurred.

As an example, MDE 240 may observe a connection attempt between the device and a server, and may identify a protocol being used by the connection. If the connection is unencrypted, MDE 240 may identify the protocol by processing messages against a list of known protocol signatures. If the connection is encrypted, MDE 240 may infer the protocol from the port via which the connection is established. MDE 240 may then attempt to establish a new connection with the server and exchange a series of requests/responses that are designed to test one or more features of the protocol (e.g., without changing the state of the server). If the server does not support the feature(s) (e.g., fails the tests), then MDE 240 may determine that the device is infected with malware. If the server supports the feature(s), then MDE 240 may determine that the service validation operation was inconclusive about whether the device is infected with malware.

As another example, if the device attempts to connect to an HTTP server on the public Internet, then MDE 240 may also attempt to connect to that HTTP server. MDE 240 may send a series of HTTP requests to test the HTTP server, such as by testing whether the HTTP correctly responds to GET, POST, HEAD, etc. requests, whether the HTTP server supports caching, whether the HTTP server correctly responds with a 400 error when MDE 240 sends a malformed request, etc. If the HTTP server fails any of the tests, then MDE 240 may determine that the device is infected with malware.

As further shown in FIG. 6, process 600 may include performing a service interference operation (block 625). For example, MDE 240 may perform a service interference operation by altering the functionality of a potentially malicious network communication received from and/or destined for a device being monitored for malware. MDE 240 may alter a request sent from and/or intended for the device, and may monitor a response to the request for a particular behavior (e.g., particular information included in the request). If the particular behavior is detected, then MDE 240 may determine that a malware infection has occurred. Additionally, or alternatively, MDE 240 may modify a malware detection score in a manner that indicates an increased likelihood that a malware infection has occurred. If the particular behavior is not detected, then MDE 240 may not reach a conclusion regarding whether a malware infection has occurred. Additionally, or alternatively, if the particular behavior is not detected, then MDE 240 may modify a malware detection score in a manner that indicates a decreased likelihood that a malware infection has occurred. MDE 240 may store information that identifies behaviors that are indicative of a malware infection.

As an example, MDE 240 may identify an Internet Relay Chat (IRC) connection between a device being monitored for malware and a server. MDE 240 may identify or insert a uniform resource locator (URL) into the IRC chat message. MDE 240 may modify the URL to point to a URL translation service or a URL shortening service (e.g., Bitly, goo.gl, etc.). The URL translation service may be provided by a server that, in response to a request that identifies a first URL (e.g., a shortened URL), will direct client device 210 to a web page identified by a second URL (e.g., a lengthened URL). MDE 240 may provide an IRC message, with the modified URL, to the device being monitored for malware.

If the IRC connection is a legitimate connection, the device may provide the message for display via an IRC chat client, and a user may click the link to access the page via a browser. In this case, a server that provides the URL translation service may provide, to MDE 240, information indicating that the message was accessed via a browser, and MDE 240 may determine that the service interference operation was inconclusive about whether the device is infected with malware. Alternatively, the server may not provide any information to MDE 240. MDE 240 may provide instructions to the server to instruct the server on an action to take in response to receiving an IRC message.

On the other hand, if the IRC connection is being used by malware on the device, then the malware is likely to access the link via an embedded web client (e.g., a non-browser). In this case, the server that provides the URL translation service may provide, to MDE 240, information indicating that the message was accessed via a non-browser, and MDE 240 may determine that the device is infected with malware.

As further shown in FIG. 6, process 600 may include performing a service provocation operation (block 630). For example, MDE 240 may perform a service provocation operation by identifying a connection attempt with a known malicious server. MDE 240 may store information that identifies known malicious servers (e.g., using a network address), and may determine that the known malicious server is identified in a message associated with a connection with a device being monitored for malware. MDE 240 may receive information that identifies known malicious servers (e.g., a black list) from one or more other devices (e.g., one or more MDEs 240 running on other devices).

In some implementations, MDE 240 may initiate an action to prevent or reduce further interactions with the malicious server. As an example, assume that MDE 240, executing on security device 220, initiates an attack intended to crash the malicious server, or to cause the malicious server to cease communicating with security device 220 and/or client device 210. As an example, security device 220 may initiate a fuzzing attack, a denial of service attack, or the like. By crashing the malicious server or causing the malicious server to block the origin of the attack (e.g., the network being protected), security device 220 prevents the malicious server from communicating with protected devices, such as client device 210.

As another example, security device 220 may fuzz messages received from the malicious server, and intended for the malware running on client device 210. For example, security device 220 may fuzz messages by inserting invalid, unexpected, and/or random information into the messages. By fuzzing a message before sending the message to the malware executing on client device 210, security device 220 may cause the malware to crash, or may prevent the malware from performing an instruction identified in the message.

As further shown in FIG. 6, process 600 may include determining one or more outcomes of the performed external malware detection operation(s) (block 635), and determining that a malware infection has occurred based on the one or more outcomes (block 640). For example, MDE 240 may determine whether one or more outcomes indicate that malware was detected. In some implementations, MDE 240 may detect a malware infection based on the outcome of a single external malware detection operation.

In some implementations, MDE 240 may detect a malware infection based on outcomes associated with multiple external malware detection operations (e.g., when multiple external malware detection operations indicate that a device is infected with malware). For example, if a threshold quantity of external malware detection operations indicate a malware infection, then MDE 240 may determine that a malware infection has occurred. Additionally, or alternatively, if a particular combination of external malware detection operations indicate a malware infection (e.g., the service validation operation and the service interference operation), then MDE 240 may determine that a malware infection has occurred.

In some implementations, MDE 240 may calculate a malware detection score based on the outcome(s) of one or more external malware detection operations. An outcome associated with a particular external malware detection operation may indicate a malware infection, may indicate no malware infection, may indicate an inconclusive result, may indicate a degree of confidence of a malware infection (e.g., based on detecting different types of modifications, behaviors, activities, etc.), or the like. MDE 240 may determine an individual malware detection score for the particular external malware detection operation based on the outcome (e.g., a value of 1 for a malware infection, a value of 0 for an inconclusive result, a value within the range of 0 and 1 for a degree of confidence, etc.). MDE 240 may determine that a malware infection has occurred if the individual malware detection score satisfies a threshold value.

Additionally, or alternatively, MDE 240 may combine individual malware detection scores for multiple external malware detection operations to generate an overall malware detection score (e.g., by adding the scores, multiplying the scores, etc.). In some implementations, MDE 240 may apply different weight values to the different outcomes to generate the overall malware detection score. MDE 240 may determine that a malware infection has occurred if the overall malware detection score satisfies a threshold value.

As further shown in FIG. 6, process 600 may include providing a notification that the malware infection has occurred (block 645). For example, MDE 240 may provide a notification that the malware infection has occurred, as described herein in connection with block 445 of FIG. 4. In this way, MDE 240 may detect malware and may mitigate negative effects associated with malware.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7F are diagrams of an example implementation 700 relating to example process 600 shown in FIG. 6. FIGS. 7A-7F show an example of detecting malware using one or more external malware detection operations.

Figure 7A:
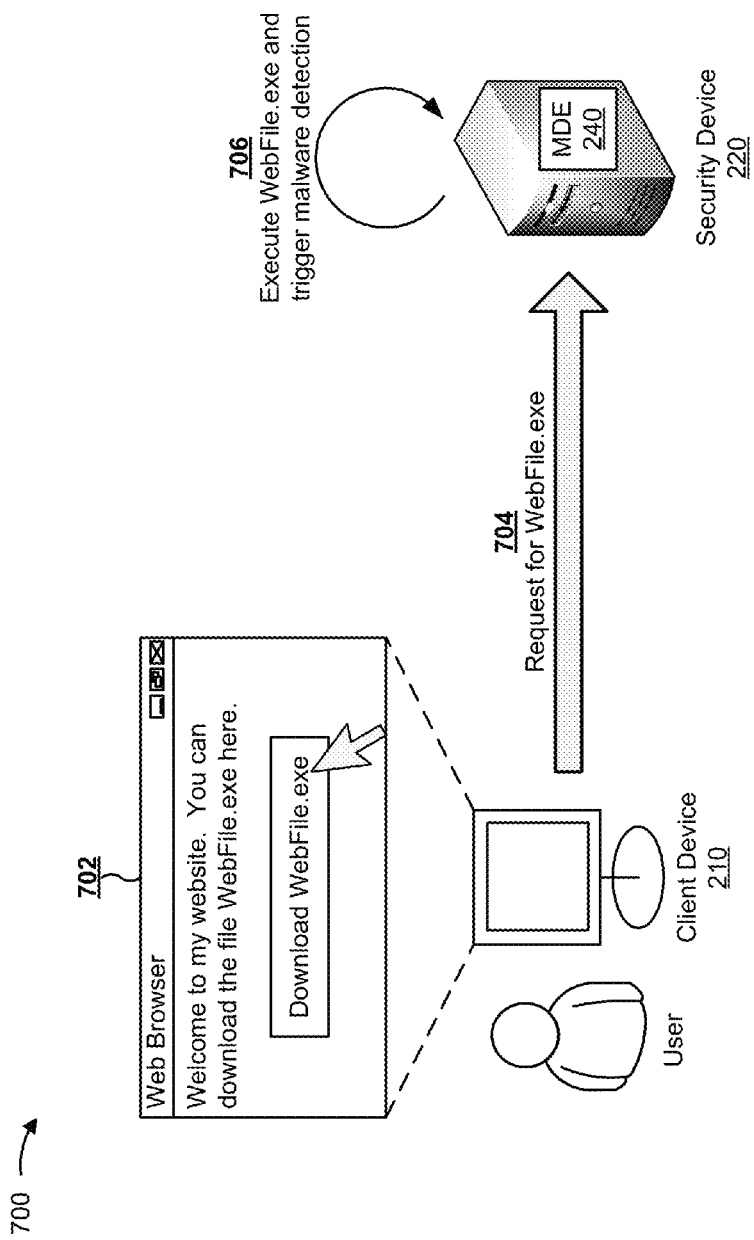
FIGS. 7A-7F are diagrams of an example implementation relating to the example process shown in FIG. 6.

As shown in FIG. 7A, and by reference number 702, assume that a user interacts with a web page, provided via client device 210, to download a file shown as "WebFile.exe." As shown by reference number 704, assume that client device 210 sends the request for WebFile.exe to security device 220. Assume that security device 220 obtains WebFile.exe (e.g., from a server associated with the web page). As shown by reference number 706, assume that MDE 240, executing on security device 220, executes WebFile.exe, which causes MDE 240 to trigger a malware detection operation.

Figure 7B:
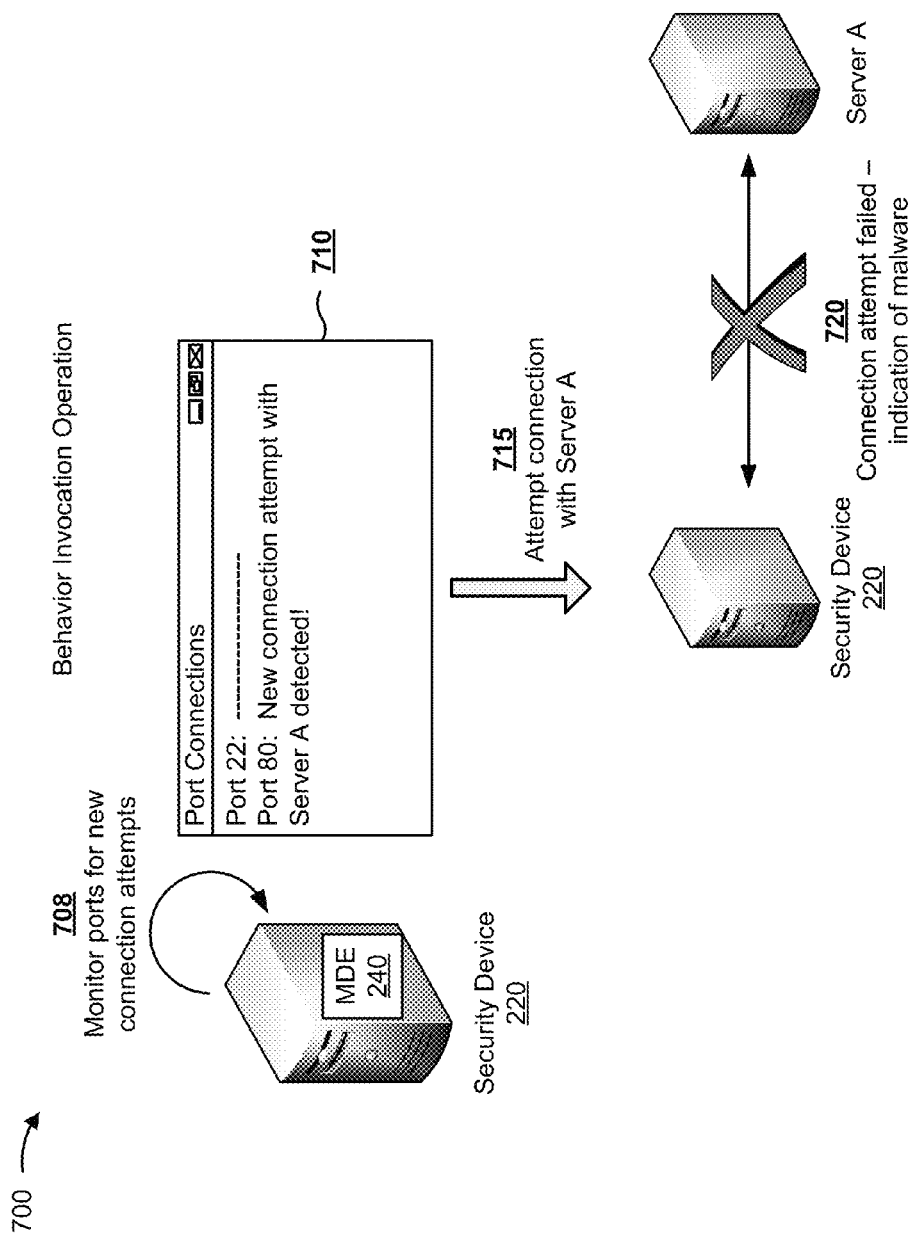

FIG. 7B shows an example behavior invocation operation performed by security device 220 (e.g., executing MDE 240). As shown by reference number 708, assume that MDE 240 monitors ports of security device 220 for new connection attempts. As shown by reference number 710, assume that MDE 240 detects a new connection attempt with Server A. As shown by reference number 715, assume that MDE 240 attempts to establish a connection with Server A. As shown by reference number 720, assume that the connection attempt fails or is invalid. This behavior indicates that security device 220 (e.g., an isolated environment executing on security device 220, such as MDE 240) has been infected with malware because Server A may only permit connections initiated by malware executing on security device 220, and may block other connection attempts.

Figure 7C:
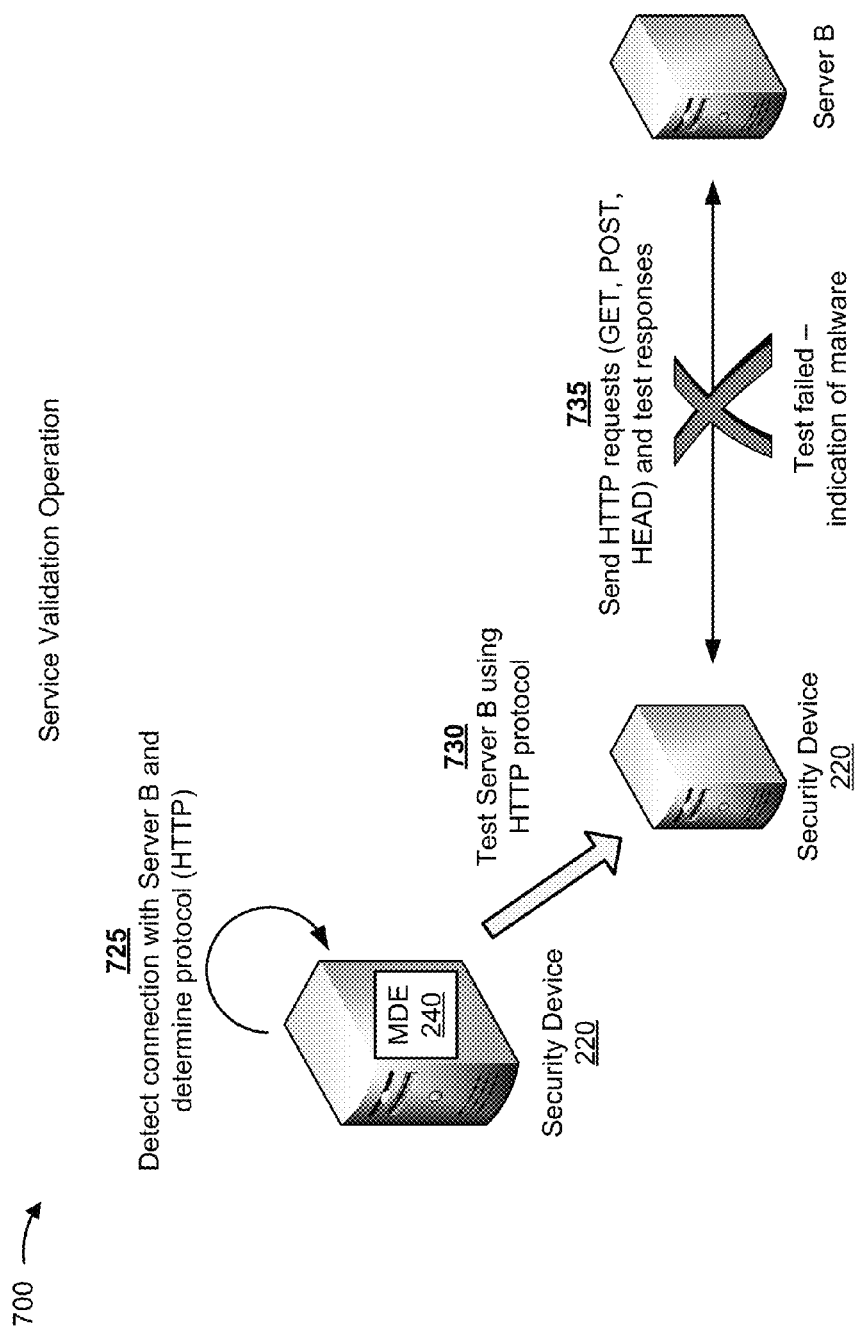

FIG. 7C shows an example service validation operation performed by security device 220. As shown by reference number 725, assume that security device 220 detects a connection with Server B, and determines that the connection uses the HTTP protocol. As shown by reference number 730, assume that security device 220 tests Server B using the HTTP protocol. As shown by reference number 735, assume that security device 220 sends HTTP requests, such as a GET request, a POST request, and a HEAD request, to Server B, and monitors the responses. Assume that security device 220 determines that the responses are invalid or incorrectly formatted. This action indicates that client device 210 has been infected with malware because users and legitimate software programs are unlikely to establish invalid connections with servers.

Figure 7D:
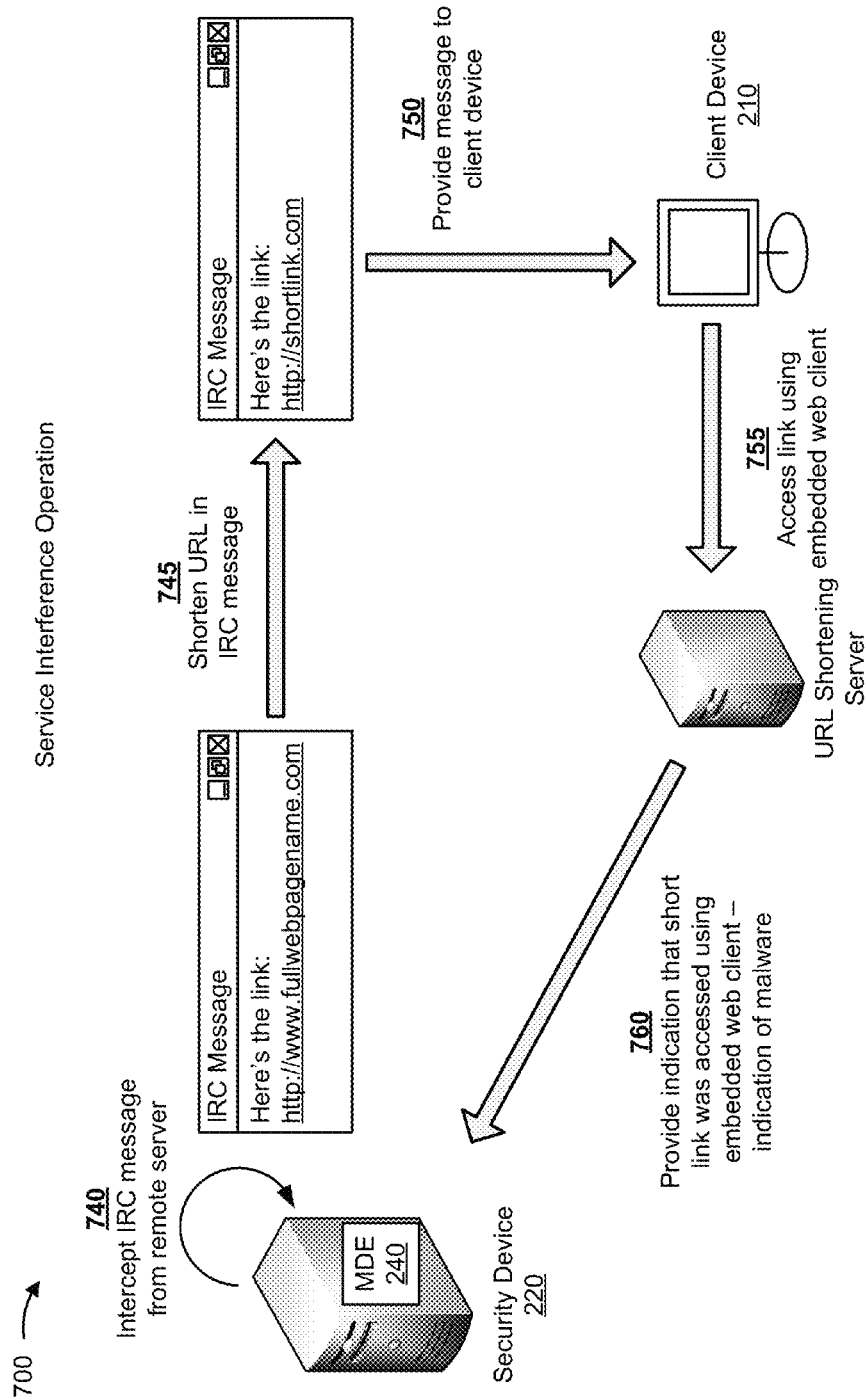

FIG. 7D shows an example service interference operation performed by security device 220. As shown by reference number 740, assume that security device 220 receives an IRC message, from a remote server, destined for client device 210. Assume that the message includes a URL, and that security device 220 shortens the URL using a URL shortening service, as shown by reference number 745. As shown by reference number 750, assume that security device 220 provides the IRC message, including the shortened URL, to client device 210. As shown by reference number 755, assume that client device 210 accesses the link using an embedded web client (e.g., indicating that the link was automatically accessed without user intervention). Assume that accessing the link causes a URL shortening server to translate the link into the full length link, and provide the result to client device 210. Assume that the URL shortening server detects that the link was accessed by an embedded web client, and provides, to security device 220, an indication that the link was accessed by an embedded web client, as shown by reference number 760. This behavior indicates that client device 210 has been infected with malware because the user likely did not request the link since the link was accessed by an automated web client rather than by a browser application.

Figure 7E:
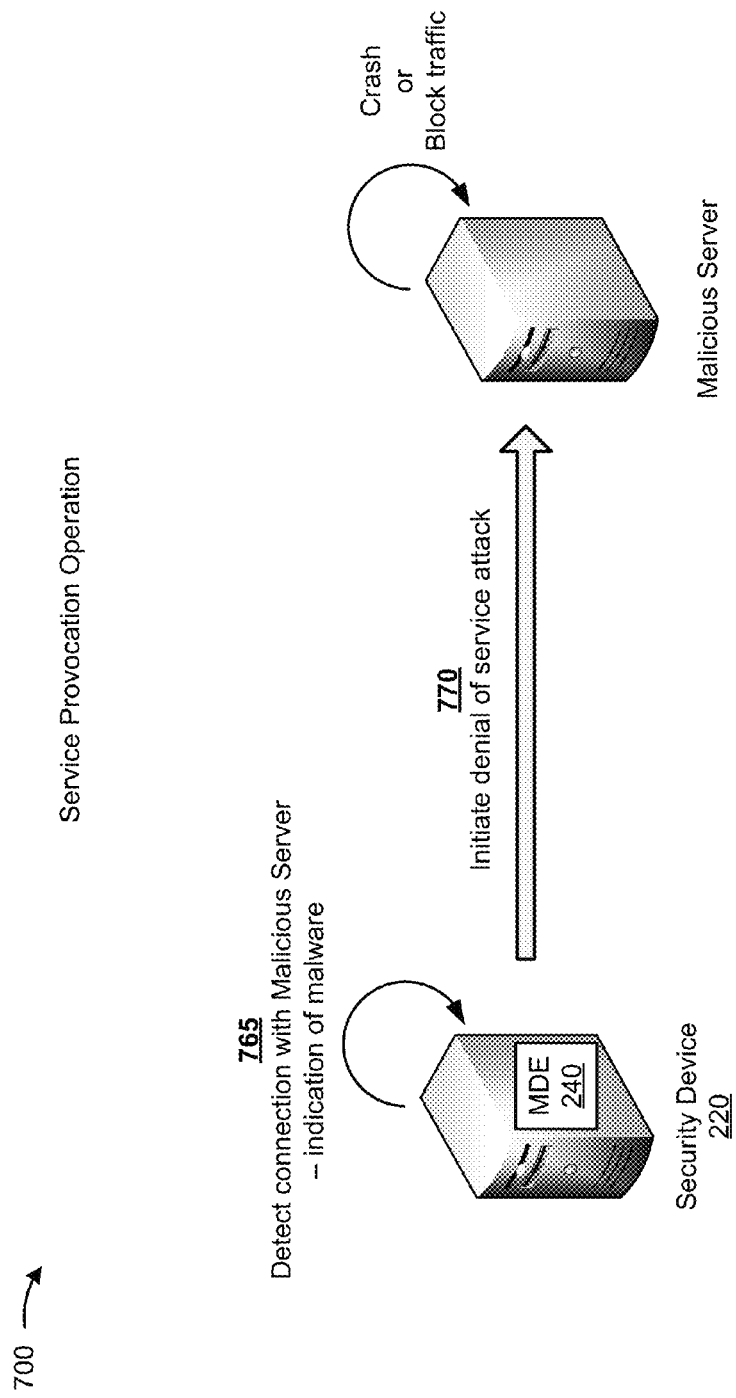

FIG. 7E shows an example service provocation operation performed by security device 220. As shown by reference number 765, assume that security device 220 detects a connection with a malicious server. For example, security device 220 may identify a source address and/or a destination address associated with a message. Security device 220 may store a list of addresses that are associated with malicious servers, and may determine that the source address or the destination address matches an address included in the list. As shown by reference number 770, assume that security device 220 initiates a denial of service attack on the malicious server, which causes the malicious server to crash or block traffic. In this way, security device 220 may prevent the malicious server from communicating with and/or infecting other devices.

Figure 7F:
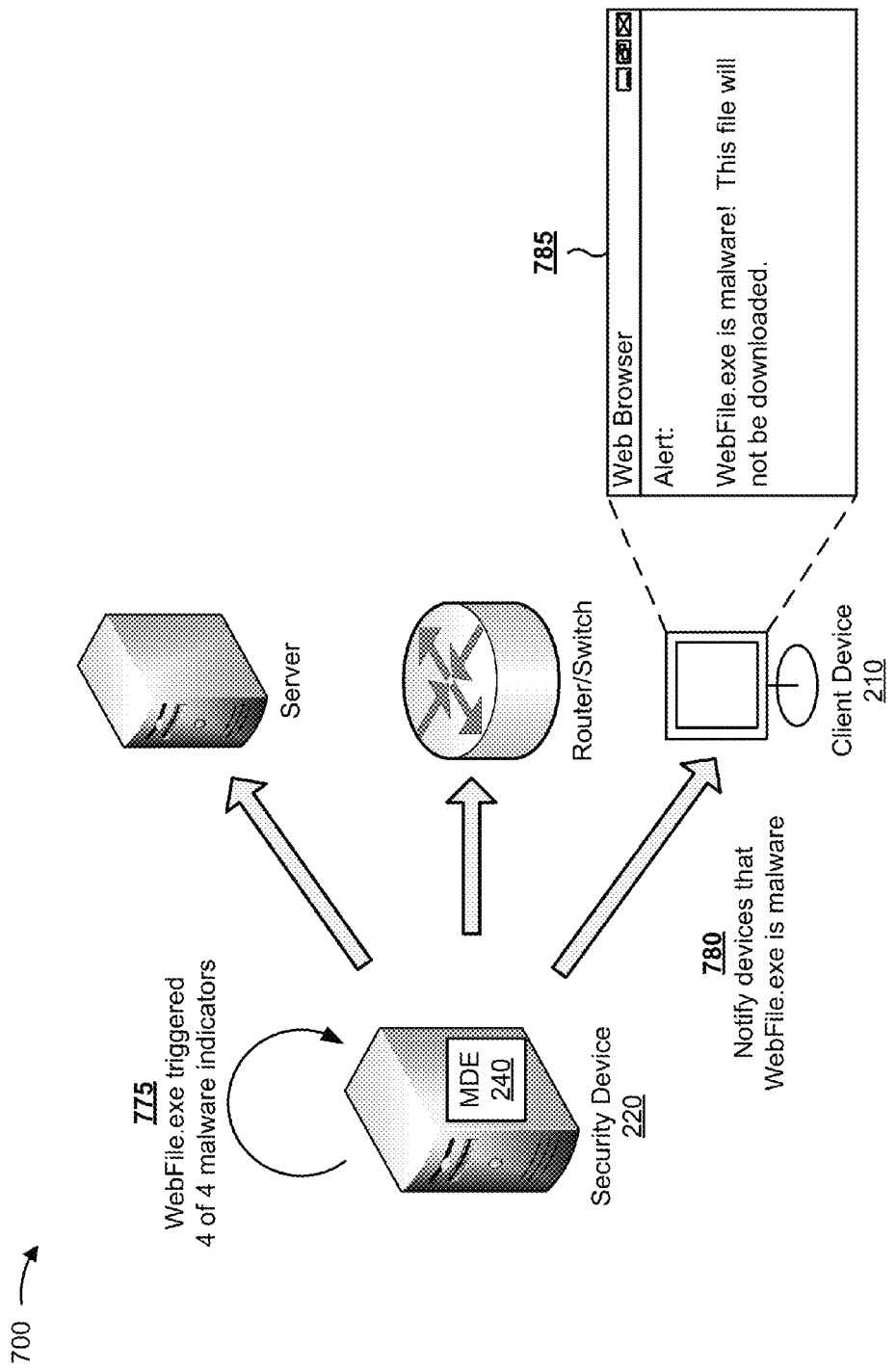

As shown in FIG. 7F, and by reference number 775, assume that security device 220 determines that four out of four external malware detection operations indicate that MDE 240, executing on security device 220, is infected with malware and/or that WebFile.exe is malware. For example, assume that a behavior invocation operation, a service validation operation, a service interference operation, and a service provocation operation all indicate that MDE 240 is infected with malware, as shown in FIGS. 7B-7E. Assume that this quantity of indications (e.g., four) satisfies a threshold, and that security device 220 notifies other network devices that WebFile.exe is malware. The network devices may prevent WebFile.exe from being downloaded and/or installed. As shown by reference number 785, client device 210 may receive the notification, and may provide an indication that WebFile.exe could not be downloaded because WebFile.exe contains malware.

In example implementation 700, MDE 240 is shown as executing on security device 220, and security device 220 is shown as performing the external malware detection operations. In some implementations, client device 210 and/or detection device 230 may execute MDE 240 and may perform some or all of the external malware detection operations.

As indicated above, FIGS. 7A-7F are provided merely as an example. Other examples are possible and may differ from what was described with regard to FIGS. 7A-7F.

Figure 8:
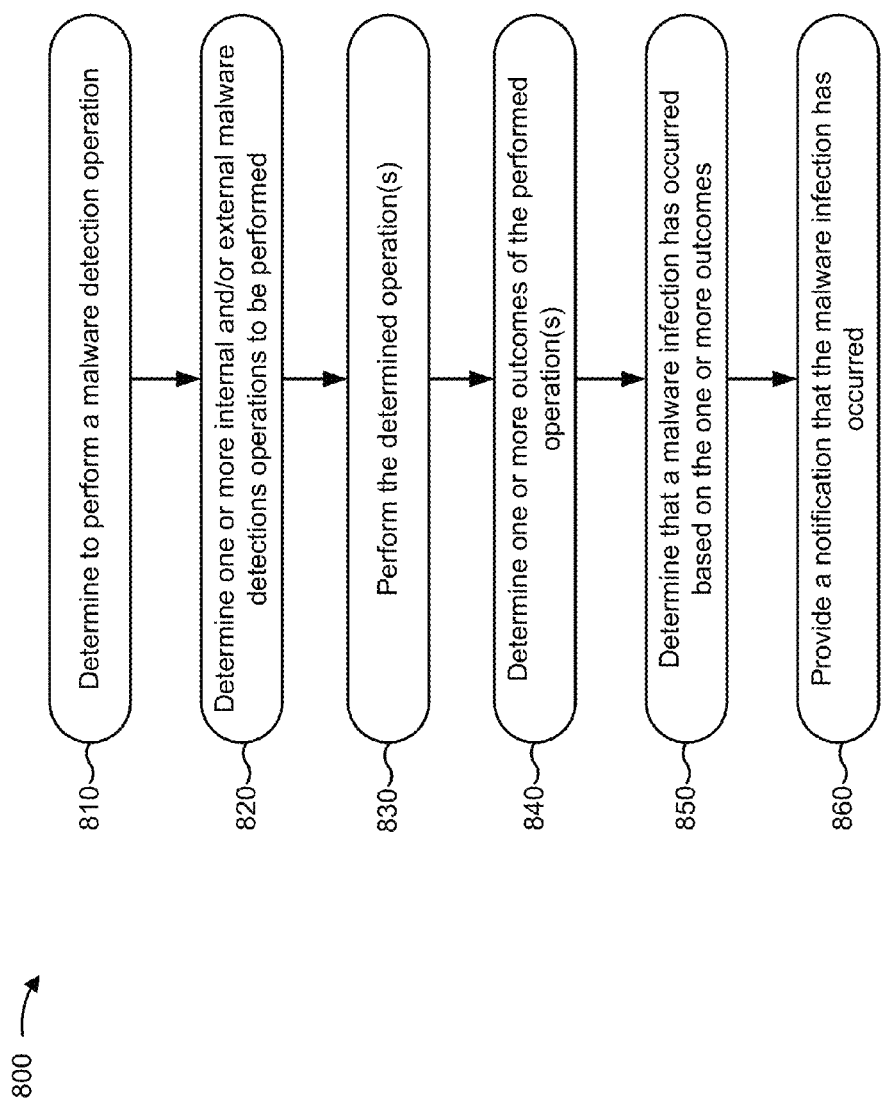
FIG. 8 is a flow chart of an example process for detecting malware using a combination of internal and external malware detection operations.

FIG. 8 is a flow chart of an example process 800 for detecting malware using a combination of internal and external malware detection operations. In some implementations, one or more process blocks of FIG. 8 may be performed by security device 220 (e.g., executing MDE 240). Additionally, or alternatively, one or more process blocks of FIG. 8 may be performed by another device or a group of devices separate from or including security device 220, such as client device 210 and/or detection device 230 (e.g., executing MDE 240).

As shown in FIG. 8, process 800 may include determining to perform a malware detection operation (block 810), determining one or more internal and/or external malware detection operations to be performed (block 820), and performing the determined operations (block 830). For example, MDE 240 may determine to perform a malware detection operation, as described herein in connection with block 405 of FIG. 4 and/or block 605 of FIG. 6. MDE 240 may determine one or more internal and/or external malware detection operations to be performed, as described herein in connection with block 410 of FIG. 4 and/or block 610 of FIG. 6. MDE 240 may perform any combination of the malware detection operations described in connection with blocks 415-430 of FIG. 4 and/or blocks 615-630 of FIG. 6.

As further shown in FIG. 8, process 800 may include determining one or more outcomes of the performed operations (block 840), and determining that a malware infection has occurred based on the one or more outcomes (block 850). For example, MDE 240 may determine one or more outcomes of the performed operations, and may detect malware based on the outcome(s), as described herein in connection with blocks 435-440 of FIG. 4 and/or blocks 635-640 of FIG. 6.

In some implementations, MDE 240 may apply different weight values to the outcomes of internal malware detection operations as compared to the outcomes of external malware detection operations. As an example, MDE 240 may weigh every operation differently (e.g., may calculate a score as $W_1I_1+W_2I_2+W_3I_3+W_4I_4+W_5E_1+W_6E_2+W_7E_2+W_8E_4$, where $W_1$ through $W_8$ represent different weight values, $I_1$ through $I_4$ represent different internal malware detection techniques, and $E_1$ through $E_4$ represent different external malware detection techniques). As another example, MDE 240 may weight internal malware detection operations using a first weight value, and may weight external malware detection operations using a second weight value (e.g., may calculate a score as $W_1I_1+W_1I_2+W_1I_3+W_1I_4+W_2E_1+W_2E_2+W_2E_2+W_2E_4$). Additionally, or alternatively, MDE 240 may apply another weighting algorithm not specifically discussed above.

As further shown in FIG. 8, process 800 may include providing a notification that the malware infection has occurred (block 860). For example, MDE 240 may provide a notification that the malware infection has occurred, as described herein in connection with block 445 of FIG. 4 and/or block 645 of FIG. 6. In this way, MDE 240 may use a variety of techniques alone or in combination to detect a malware infection.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
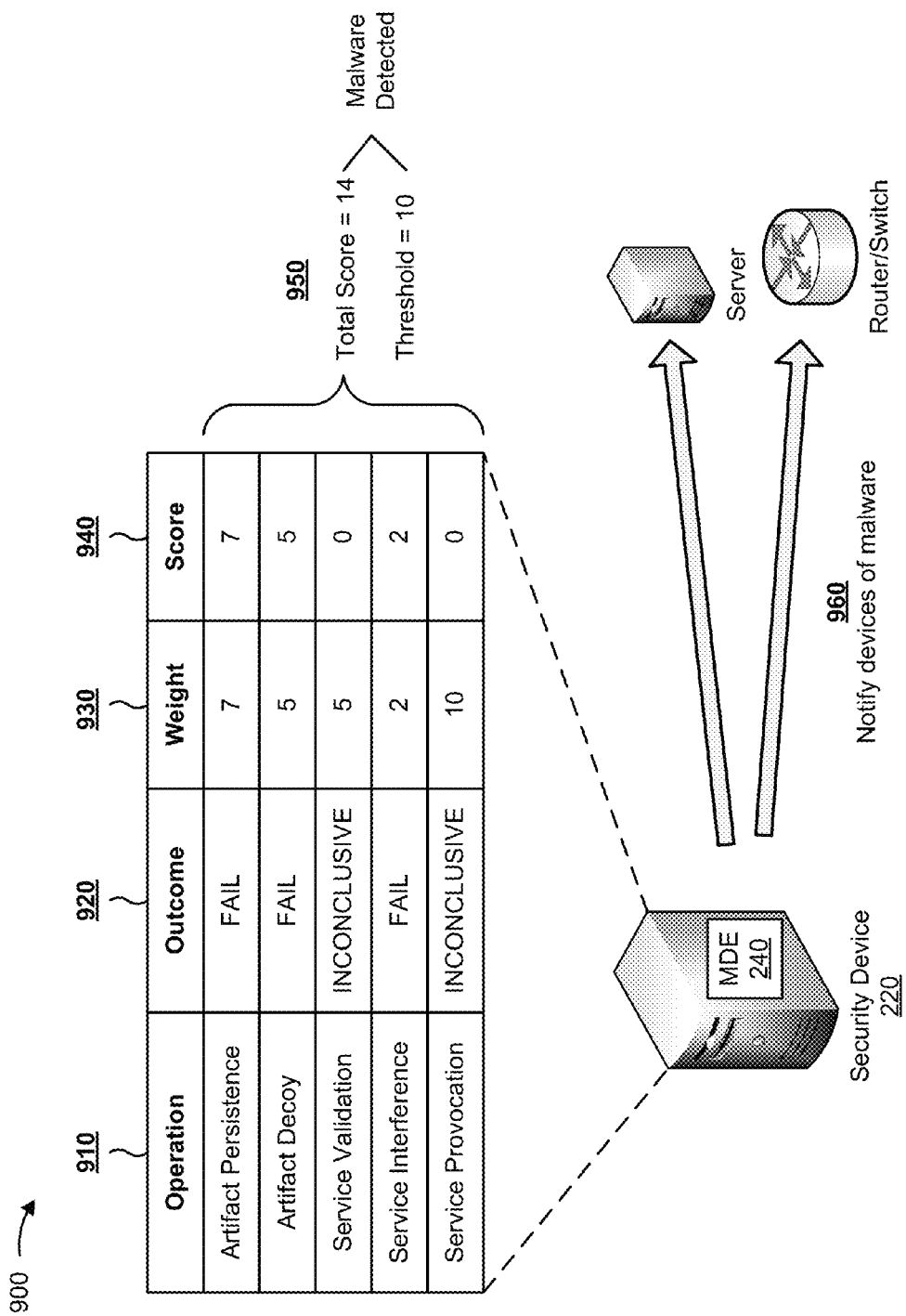
FIG. 9 is a diagram of an example implementation relating to the example process shown in FIG. 8.

FIG. 9 is a diagram of an example implementation 900 relating to example process 800 shown in FIG. 8. FIG. 9 shows an example of detecting malware using a combination of internal and external malware detection operations.

As shown in FIG. 9, and by reference number 910, assume that security device 220 has performed two internal malware detection operations, shown as an artifact persistence operation and an artifact decoy operation, and that security device 220 has performed three external malware detection operations, shown as a service validation operation, a service interference operation, and a service provocation operation. As shown by reference number 920, assume that the artifact persistence operation, the artifact decoy operation, and the service interference operation all failed, which indicates a malware infection. Assume that the service validation operation and the service provocation operation were inconclusive.

As shown by reference number 930, assume that each operation is associated with a weight value. As shown by reference number 940, assume that security device 220 calculates an individual malware detection score for each operation based on the weight value and whether the operation failed. For example, if the operation failed, then security device 220 sets the score to the weight value (e.g., $1 \times W_n$). Otherwise (e.g., if the operation passed or was inconclusive), then security device 220 sets the score to zero (e.g., $0 \times W_n$). As shown by reference number 950, assume that security device 220 sums the individual malware detection scores to calculate an overall malware detection score of 14. Assume that security device 220 determines that the overall score of 14 satisfies a threshold value of 10 (e.g., is greater than 10). In this case, the overall score indicates a malware infection. As shown by reference number 960, security device 220 notifies other network devices of the malware infection.

As indicated above, FIG. 9 is provided merely as an example. Other examples are possible and may differ from what was described with regard to FIG. 9.

Implementations described herein may detect malware after the malware has been installed and executed on a computing system and/or in a malware detection environment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   one or more processors; and
   a memory storing instructions that, when executed by the one or more processors, cause the one or more processors to:
   determine to perform an internal malware detection operation to detect malware executing on a client device;
   perform the internal malware detection operation,
     the internal malware detection operation being performed locally on a particular device without requiring communication with another device, and
     the internal malware detection operation including at least one of:
       an artifact persistence operation to delete a first artifact and determine whether the first artifact has been recreated,
       an artifact decoy operation to create a second artifact and determine whether the second artifact has been modified, or
       an artifact integrity operation to detect that a third artifact has been modified in a particular manner;
   modify an environment executing on the particular device, to form a modified environment, based on performing the internal malware detection operation;
   monitor the modified environment for a particular behavior indicative of a malware infection;
   detect that the particular behavior has occurred; and
   provide a notification that the client device is infected with malware based on detecting that the particular behavior has occurred,
     the notification causing one or more network devices to block network traffic to or from the client device.

2. The system of claim 1, where the client device and the particular device are a same device.

3. The system of claim 1, where the client device and the particular device are different devices.

4. The system of claim 1, where the one or more processors, when performing the artifact persistence operation, are to:
   monitor a particular location within the environment;
   detect that the first artifact has been created in the particular location based on monitoring the particular location; and
   delete the first artifact;
   where the one or more processors, when monitoring the modified environment for the particular behavior, are to:
     monitor the environment to determine whether the first artifact has been recreated within a threshold amount of time;
   where the one or more processors, when detecting that the particular behavior has occurred, are to:
     detect that the first artifact has been recreated within the threshold amount of time; and
   where the one or more processors, when providing the notification that the client device is infected with malware, are to:
     provide the notification that the client device is infected with malware based on detecting that the first artifact has been recreated within the threshold amount of time.

5. The system of claim 1, where the one or more processors, when performing the artifact decoy operation, are to:
  create the second artifact in a particular location of the environment;
  where the one or more processors, when monitoring the modified environment for the particular behavior, are to:
    monitor the environment to determine whether the second artifact has been modified;
  where the one or more processors, when detecting that the particular behavior has occurred, are to:
    detect that the second artifact has been modified; and
  where the one or more processors, when providing the notification that the client device is infected with malware, are to:
    provide the notification that the client device is infected with malware based on detecting that the second artifact has been modified.

6. The system of claim 1, where the one or more processors, when performing the artifact integrity operation, are to:
  monitor the environment to determine whether the third artifact has been modified in the particular manner;
  where the one or more processors, when detecting that the particular behavior has occurred, are to:
    detect that the third artifact has been modified in the particular manner; and
  where the one or more processors, when providing the notification that the client device is infected with malware, are to:
    provide the notification that the client device is infected with malware based on detecting that the third artifact has been modified in the particular manner.

7. The system of claim 1, where the internal malware detection operation further includes:
  an illogical behavior operation to determine whether an illogical behavior has occurred;
  where the one or more processors are further to:
    determine an outcome of performing a respective internal malware detection operation; and
    determine that the client device is infected with malware based on the outcome; and
  where the one or more processors, when providing the notification that the client device is infected with malware, are to:
    provide the notification that the client device is infected with malware based on determining that the client device is infected with malware.

8. A non-transitory computer-readable medium storing instructions, the instructions comprising:
  one or more instructions that, when executed by one or more processors, cause the one or more processors to:
  determine to perform an internal malware detection operation to detect malware executing on a client device;
  perform the internal malware detection operation,
  the internal malware detection operation being performed locally on a particular device without requiring communication with another device;
  monitor a particular location within an environment executing on the particular device;
  detect that an artifact has been created in the particular location of the environment;
  delete the artifact;
  monitor the particular location to determine whether the artifact has been recreated within a threshold amount of time;
  detect that the artifact has been recreated within the threshold amount of time and
  provide a notification that the client device is infected with malware based on detecting that the artifact has been recreated within the threshold amount of time
  the notification causing one or more network devices to block network traffic to or from the client device.

9. The computer-readable medium of claim 8, where the client device and the particular device are a same device.

10. The computer-readable medium of claim 8, where the client device and the particular device are different devices.

11. The computer-readable medium of claim 8, where the artifact is a first artifact and the particular location is a first particular location;
  where the one or more instructions, when executed by the one or more processors, further cause the one or more processors to:
    create a second artifact in a second particular location of the environment;
    monitor the second particular location to determine whether the second artifact has been modified;
    detect that the second artifact has been modified; and
    provide the notification that the client device is infected with malware based on detecting that the second artifact has been modified.

12. The computer-readable medium of claim 8, where the artifact is a first artifact and the particular location is a first particular location;
  where the one or more instructions, when executed by the one or more processors, further cause the one or more processors to:
    monitor the environment to determine whether a second artifact has been modified in a particular manner;
    detect that the second artifact has been modified in the particular manner; and
    provide the notification that the client device is infected with malware based on detecting that the second artifact has been modified in the particular manner.

13. The computer-readable medium of claim 12, where the second artifact is a system file log; and
  where the one or more instructions, when detecting that the second artifact has been modified in the particular manner, cause the one or more processors to:
    detect that a fake log in the system file has been edited or deleted.

14. The computer-readable medium of claim 8, where the artifact is a first artifact;
  where the internal malware detection operation includes at least one of:
    an artifact decoy operation to create a second artifact and determine whether the second artifact has been modified,
    an artifact integrity operation to detect that a third artifact has been modified in a particular manner, or
    an illogical behavior operation to determine whether an illogical behavior has occurred;
  where the one or more instructions, when executed by the one or more processors, further cause the one or more processors to:
    determine an outcome of performing a respective internal malware detection operation; and
    determine that the client device is infected with malware based on the outcome; and
  where the one or more instructions, that cause the one or more processors to provide the notification that the client device is infected with malware, cause the one or more processors to:

provide the notification that the client device is infected with malware based on determining that the client device is infected with malware.

15. A method, comprising:
   determining, by a particular device, to perform an internal malware detection operation to detect malware executing on a client device;
   performing, by the particular device, the internal malware detection operation,
      the internal malware detection operation being performed locally on the particular device without requiring communication with another device, and
      performing the internal malware detection operation comprising:
         monitoring, by the particular device, a particular location within an environment executing on the particular device,
         detecting, by the particular device, that an artifact has been created in the particular location based on monitoring the particular location,
         modifying, by the particular device, the environment to form a modified environment based on performing the internal malware detection operation,
            modifying the environment comprising:
               deleting the artifact,
         monitoring, by the particular device, the modified environment for a particular behavior indicative of a malware infection,
            monitoring the modified environment for the particular behavior indicative of the malware infection comprising:
               monitoring the modified environment to determine whether the artifact has been recreated within a threshold amount of time;
         detecting, by the particular device, that the particular behavior has occurred,
            detecting that the particular behavior has occurred comprising:
               detecting that the artifact has been recreated within the threshold amount of time; and
         providing, by the particular device, a notification that the client device is infected with malware based on detecting that the particular behavior has occurred,
            providing the notification that the client device is infected with malware based on detecting that the particular behavior has occurred comprising:
               providing the notification that the client device is infected with malware based on detecting that the artifact has been recreated within the threshold amount of time, and
            the notification causing one or more network devices to block network traffic to or from the client device.

16. The method of claim 15, where the particular location is a first particular location; and
where performing the internal malware detection operation further comprises:
   monitoring a second particular location,
   determining that a shortcut has been created in the particular location,
   determining that the shortcut points to a file stored in a recycle bin, and
   providing a notification that the client device is infected with malware based on determining that the shortcut points to the file stored in the recycle bin.

17. The method of claim 15, where the client device and the particular device are a same device.

18. The method of claim 15, where the client device and the particular device are different devices.

19. The method of claim 15, where the artifact is a first artifact and the particular location is a first particular location;
   where modifying the environment further comprises:
      creating a second artifact in a second particular location of the environment;
   where monitoring the modified environment for the particular behavior further comprises:
      monitoring the environment to determine whether the second artifact has been modified;
   where detecting that the particular behavior has occurred further comprises:
      detecting that the second artifact has been modified; and
   where providing the notification that the client device is infected with malware further comprises:
      providing the notification that the client device is infected with malware based on detecting that the second artifact has been modified.

20. The method of claim 15, where the artifact is a first artifact;
   where performing the internal malware detection operation further comprises at least one of:
      an artifact decoy operation to create a second artifact and determine whether the second artifact has been modified,
      an artifact integrity operation to detect that a third artifact has been modified in a particular manner, or
      an illogical behavior operation to determine whether an illogical behavior has occurred;
   where the method further comprises:
      determining an outcome of performing a respective internal malware detection operation; and
      determining that the client device is infected with malware based on the outcome; and
   where providing the notification that the client device is infected with malware further comprises:
      providing the notification that the client device is infected with malware based on determining that the client device is infected with malware.

* * * * *